US012802346B2

(12) United States Patent
Li

(10) Patent No.: US 12,802,346 B2
(45) Date of Patent: Nov. 17, 2026

(54) ILLUMINATION CONTROL IN A VIRTUAL ENVIRONMENT

(71) Applicant: Tencent Technology (Shenzhen) Company Limited, Shenzhen (CN)

(72) Inventor: Rui Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 119 days.

(21) Appl. No.: 18/932,604

(22) Filed: Oct. 30, 2024

(65) Prior Publication Data

US 2025/0054228 A1 Feb. 13, 2025

Related U.S. Application Data

(63) Continuation of application No. PCT/CN2023/119357, filed on Sep. 18, 2023.

(30) Foreign Application Priority Data

Oct. 20, 2022 (CN) ......................... 202211289063.4

(51) Int. Cl.
*G06T 15/50* (2011.01)
*G06T 15/06* (2011.01)

(52) U.S. Cl.
CPC ............ *G06T 15/506* (2013.01); *G06T 15/06* (2013.01)

(58) Field of Classification Search
None
See application file for complete search history.

(56) References Cited

U.S. PATENT DOCUMENTS 6,980,697 B1 12/2005 Basso et al.
2015/0290539 A1 10/2015 Lemer
2016/0307372 A1* 10/2016 Pitts ..................... H04N 23/957
(Continued)

FOREIGN PATENT DOCUMENTS

CN 116503520 A 7/2023

OTHER PUBLICATIONS

International Search Report received for PCT Patent Application No. PCT/CN2023/119357, mailed on Dec. 22, 2023, 7 pages (3 pages of English Translation and 4 pages of Original Document).
(Continued)

*Primary Examiner* — Frank S Chen
(74) *Attorney, Agent, or Firm* — ARENTFOX SCHIFF LLP

(57) ABSTRACT

In a method for controlling illumination in a virtual environment, a current position of a virtual object in the virtual environment is obtained. A target virtual light source is identified based on the current position. Reference pose data for the target virtual light source is determined based on a reference position of the virtual object. A pose offset for the target virtual light source is calculated based on the movement of the virtual object from the reference position to the current position. The reference pose data is updated based on the pose offset to obtain target pose data for the target virtual light source. Target illumination data is obtained based on illumination data of the target virtual light source. The illumination for the virtual object is rendered based on the target illumination data and the target pose data of the target virtual light source.

20 Claims, 8 Drawing Sheets

(56) References Cited

U.S. PATENT DOCUMENTS

| | | | | |
|---|---|---|---|---|
| 2022/0309742 A1* | 9/2022 | Bigos | G06N 3/09 | |
| 2023/0260193 A1* | 8/2023 | Rump | G06T 11/10 | 345/419 |

OTHER PUBLICATIONS

Office Action received for Chinese Patent Application No. 202211289063.4, mailed on Aug. 25, 2026, 19 pages (11 pages of General Translation and 8 pages of Original Document).

* cited by examiner

ILLUMINATION CONTROL IN A VIRTUAL ENVIRONMENT

RELATED APPLICATIONS

The present application is a continuation of International Application No. PCT/CN2023/119357, filed on Sep. 18, 2023, which claims priority to Chinese Patent Application No. 202211289063.4, filed on Oct. 20, 2022. The entire disclosures of the prior applications are hereby incorporated by reference.

FIELD OF THE TECHNOLOGY

This application relates to the field of computer technologies, including illumination control in a virtual environment.

BACKGROUND OF THE DISCLOSURE

With the development of computer technologies, there is an increasing demand for illumination in a virtual scene. For example, a virtual illuminant may be used to illuminate a virtual object in the virtual scene, so that the virtual object produces an expected illumination effect. For example, in a game scene, the virtual illuminant may be set in the game scene, and the virtual illuminant is used to illuminate a virtual object in the game scene. The virtual object may be a virtual animal or a virtual character, for example, a digital human. The virtual illuminant may be, for example, a virtual lamp.

In a related technology, the virtual scene is illuminated according to a pre-set fixed illumination trajectory. However, performing illumination by using the pre-set fixed illumination trajectory has limitations, and does not necessarily meet an actual scene requirement. Therefore, there is a problem of an abnormal illumination effect in irradiating, resulting in a poor illumination effect. In addition, in the related technology, for a solution of performing illumination by using a virtual light, illumination is performed in a manual manner, and then a movement manner of the light is arranged in advance according to an actual condition. When the light is needed, the light is manually triggered. An illuminating process takes a long time, which occupies more computer resources.

SUMMARY

Embodiments of this disclosure include an illumination control method, apparatus, and a non-transitory computer-readable storage medium. Examples of technical solutions in the embodiments of this disclosure may be implemented as follows:

An aspect of this disclosure provides a method for controlling illumination in a virtual environment. A current position of a virtual object in the virtual environment is obtained. A target virtual light source is identified based on the current position. A pose of the target virtual light source is configured to change based on movement of the virtual object. Reference pose data for the target virtual light source is determined based on a reference position of the virtual object. A pose offset for the target virtual light source is calculated based on the movement of the virtual object from the reference position to the current position. The reference pose data is updated based on the pose offset to obtain target pose data for the target virtual light source. Target illumination data is obtained based on illumination data of the target virtual light source. The illumination for the virtual object is rendered based on the target illumination data and the target pose data of the target virtual light source.

An aspect of this disclosure provides an apparatus. The apparatus includes processing circuitry configured to obtain a current position of a virtual object in a virtual environment. The processing circuitry is configured to identify a target virtual light source based on the current position. A pose of the target virtual light source is configured to change based on movement of the virtual object. The processing circuitry is configured to determine reference pose data for the target virtual light source based on a reference position of the virtual object. The processing circuitry is configured to calculate a pose offset for the target virtual light source based on the movement of the virtual object from the reference position to the current position. The processing circuitry is configured to update the reference pose data based on the pose offset to obtain target pose data for the target virtual light source. The processing circuitry is configured to obtain target illumination data based on illumination data of the target virtual light source. The processing circuitry is configured to render illumination for the virtual object based on the target illumination data and the target pose data of the target virtual light source.

An aspect of this disclosure provides a non-transitory computer-readable storage medium storing instructions which when executed by a processor cause the processor to perform any of the methods of this disclosure.

Details of one or more embodiments of this disclosure are provided in the subsequent accompanying drawings and descriptions. Other features, objectives, and advantages of this disclosure will become apparent from the specification, the accompanying drawings, and the claims.

BRIEF DESCRIPTION OF THE DRAWINGS

To describe the technical solutions in the embodiments of this disclosure, the following briefly introduces the accompanying drawings required for describing the embodiments. The accompanying drawings in the following description show only some embodiments of this disclosure, and a person of ordinary skill in the art may still derive other accompanying drawings from the accompanying drawings.

DESCRIPTION OF EMBODIMENTS

To make the objectives, technical solutions, and advantages of this disclosure clearer and more comprehensible, the following further describes this disclosure in further detail with reference to the accompanying drawings and the embodiments. The specific embodiments described herein are only used for explaining this disclosure, and are not used for limiting this disclosure.

Figure 1:
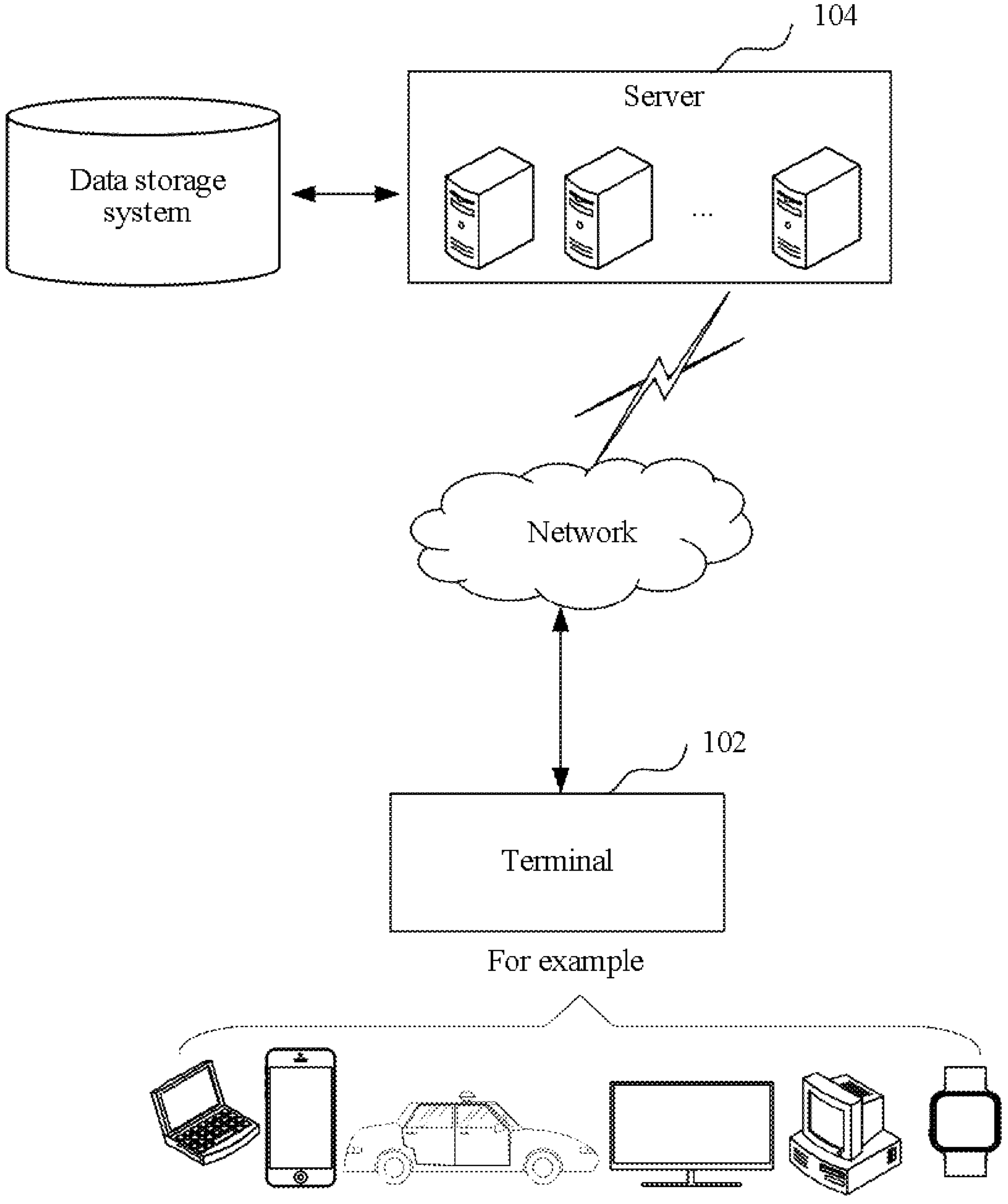
FIG. 1 is a diagram of an application environment of an illumination control method according to some embodiments.

An illumination control method provided in embodiments of this disclosure may be applied to an application environment shown in FIG. 1. A terminal 102 communicates with a server 104 through a network. A data storage system may store data that the server 104 needs to process. The data storage system may be integrated on the server 104, or placed on the cloud or other servers. An application configured for rendering an image of a virtual scene may be run on the terminal 102. For example, when the virtual scene is a game scene, a game engine may be run on the terminal 102. The game engine refers to some pre-written editable computer game systems or core components of some interactive real-time image applications. These systems provide a game designer with various tools needed to write a game, which aims to allow the game designer to create a game program more easily and quickly without starting from scratch. The game engine may support a plurality of operating platforms. The game engine may include the following systems: a rendering engine, a physics engine, a collision detection system, a sound effect, a scripting engine, computer animation, artificial intelligence, a network engine, scene management, or the like. The rendering engine may also be referred to as a renderer, including a two-dimensional graphics engine and a three-dimensional graphics engine.

Specifically, the terminal 102 may determine at least one target virtual illuminant based on a current object position to which a virtual object moves in the virtual scene, determine reference posture information, determine a posture offset produced for the target virtual illuminant when the virtual object changes from a preset reference object position to the current object position, update the reference posture information by using the posture offset, to obtain target posture information of the target virtual illuminant, obtain illumination information that is of the target virtual illuminant and that is configured for rendering to obtain target illumination information, and perform illumination rendering on the virtual object by using target illumination information and the target posture information of the at least one target virtual illuminant, to obtain an image including the virtual object. The target virtual illuminant is a virtual illuminant whose posture varies with the movement of the virtual object in the virtual scene. The reference posture information is posture information of the target virtual illuminant in a case that the virtual object is located at a reference object position. The terminal 102 may save or display a rendered image including the virtual object, or transmit a rendered image including the virtual object to another device. For example, the terminal 102 may transmit the rendered image including the virtual object to the server 104 in FIG. 1, and the server 104 may store the image including the virtual object or forward the image including the virtual object.

The terminal 102 may be, but is not limited to, various desktop computers, laptops, smartphones, tablets, internet of things devices, and portable wearable devices. The internet of things devices may be a smart speaker, a smart television, a smart air conditioner, a smart vehicle-mounted device, and the like. The portable wearable devices may be a smart watch, a smart bracelet, a head-mounted device, and the like. The server 104 may be implemented by using an independent server or a server cluster that includes a plurality of servers.

Figure 2:
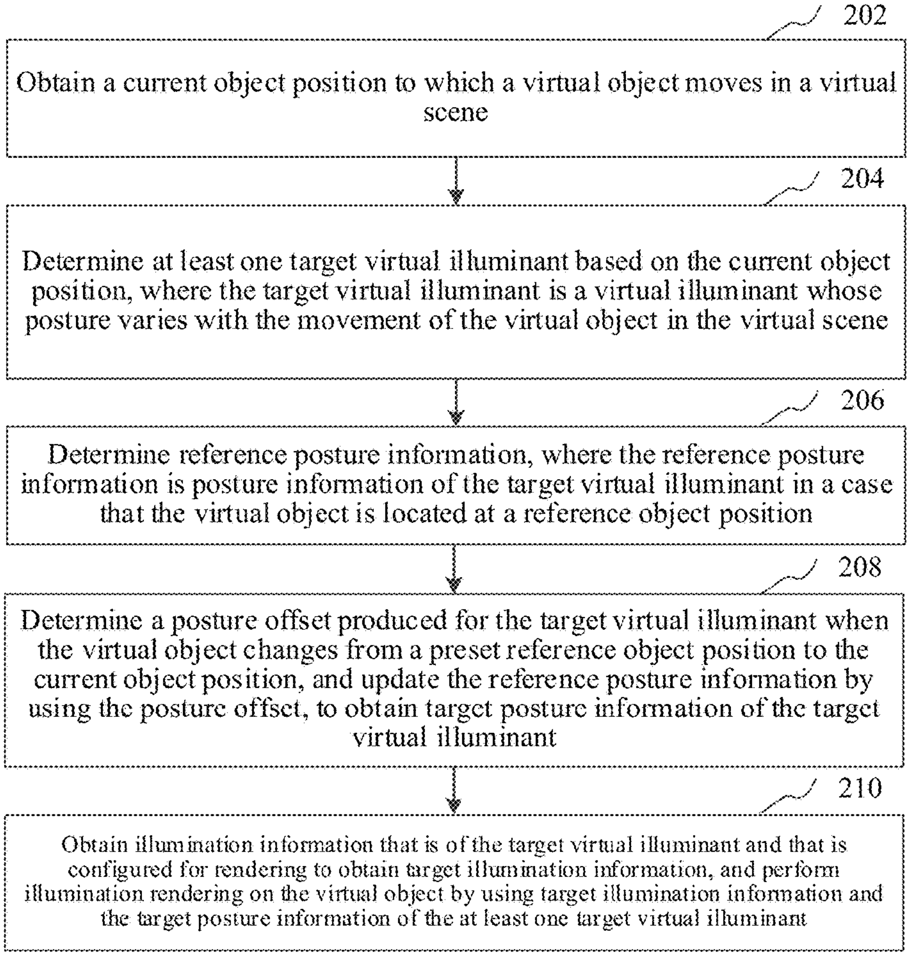
FIG. 2 is a schematic flowchart of an illumination control method according to some embodiments.

In some embodiments, as shown in FIG. 2, an illumination control method is provided. The method may be performed by a terminal or a server, or may be jointly performed by a terminal and a server. An example in which the method is applied to the terminal 102 in FIG. 1 is used for description. The following operations are included.

Operation 202: Obtain a current object position to which a virtual object moves in a virtual scene. For example, a current position of a virtual object in the virtual environment is obtained.

The virtual scene refers to a virtual scene displayed (or provided) when an application is run on the terminal. The virtual scene may be a simulated environment of a real world, or may be a semi-simulated semi-fictional virtual scene, or may be an entirely fictional virtual scene. The virtual scene may be any one of a two-dimensional virtual scene, a 2.5-dimensional virtual scene, or a three-dimensional virtual scene.

The virtual object may be a virtual image used for representing a user in the virtual scene. The virtual scene may include one or more virtual objects, and a plurality refers to at least two. Each virtual object has a shape and a volume in the virtual scene, and occupies some space in the virtual scene. The virtual object may move in the virtual scene. The virtual object may be a digital human, a virtual animal, a cartoon character, or the like. A user may control the virtual object to move in the virtual scene.

The digital human is a computer-generated character designed to replicate human behaviors and personality traits. In other words, the digital human is a realistic three-dimensional (3D) human model. The digital human may appear anywhere in realism, from fantasy characters (representing human beings) of children to hyper-realistic digital actors. These characters are virtually indistinguishable from actual human beings. Advances in the digital human are primarily driven by talents and technologies in a converging world of animation, a visual effect, and a video game. The digital human may include a virtual human and a virtual digital human. An identity of the virtual human is fictitious, and does not exist in the real world. For example, the virtual human includes a virtual anchor. The virtual digital human emphasizes the virtual identity and digital production characteristics. The virtual digital human may have the following three characteristics: First, the virtual digital human has human appearance and specific character features such as appearance, gender, and personality; second, the virtual digital human has human behaviors and a capability to express through languages, facial expressions, and body movements; and third, the virtual digital human has human thoughts and a capability to recognize an external environment and communicate and interact with human beings.

An object position refers to a position of the virtual object in the virtual scene. The object position may be represented by a position of a specified part of the virtual object. For example, a position of a skeleton of the virtual object may be used to represent the object position. The skeleton includes but is not limited to a skeleton of the head, a skeleton of the chest, a skeleton of the leg, a skeleton of the foot, or the like. For example, the position of the skeleton of the head may be used to represent the object position of the virtual object. The virtual object may have a default position in the virtual scene, and the default position of the virtual object in the virtual scene may be referred to as a preset object position.

Operation 204: Determine at least one target virtual illuminant based on the current object position, where the target virtual illuminant is a virtual illuminant, whose posture varies with the movement of the virtual object in the virtual scene. For example, a target virtual light source is identified based on the current position. In an example, a pose of the target virtual light source is configured to change based on movement of the virtual object.

The virtual scene is a scene with illumination, and the virtual scene may include one or more virtual illuminants, where a plurality of means at least two. The illuminant is a light source. The light source may include a natural light source and an artificial light source. The sun, a turned-on electric light, a burning candle, and the like are all light sources. The virtual illuminant is a virtual light source, such as a virtual sun or a virtual electric light. The virtual illuminant is configured to implement illumination in the virtual scene. A size of the virtual illuminant may be preset and modified. The virtual illuminant may exist in the virtual scene. For example, the virtual scene is a virtual stage scene, the virtual illuminant is a small virtual light source or a large virtual light source configured to illuminate the stage, and the stage scene may be a small closed scene or a large scene.

The virtual illuminant has a posture, and the posture includes a position and a direction. The direction may be, for example, an orientation of the virtual illuminant. A posture of the virtual illuminant may be changed by changing posture information of the virtual illuminant. The posture information includes position information and direction information. The position information may include three-dimensional coordinates of the virtual illuminant in a three-dimensional space. The three-dimensional space refers to a three-dimensional space in which the virtual scene is located. The direction information may include a Euler angle of the virtual illuminant in the three-dimensional space, and the direction information is configured for controlling an orientation of the virtual illuminant. A shape of the virtual illuminant may be set as needed, for example, may be in a shape of a circle or a square, and for example, may be a virtual spotlight. The virtual illuminant further has illumination information. The illumination information includes an illumination intensity, an illumination color, or the like.

The virtual scene may include a plurality of virtual illuminants. Among the virtual illuminants, there may be one or more virtual illuminants whose postures vary with movement of the virtual object, and a plurality of means at least two.

The target virtual illuminant belongs to a virtual illuminant whose posture varies with the movement of the virtual object in the virtual scene. A quantity of target virtual illuminants may be one or more. For example, all virtual illuminants in the virtual scene whose postures vary with the movement of the virtual object may be the target virtual illuminants. Alternatively, the target virtual illuminant may be determined from the virtual illuminants whose postures vary with the movement of the virtual object. For example, the target virtual illuminant may be determined, according to the current object position, from the virtual illuminants whose postures vary with the movement of the virtual object. For example, among the virtual illuminants whose postures vary with the movement of the virtual object, when a distance between a virtual illuminant and the current object position is less than a distance threshold, the virtual illuminant may be determined as the target virtual illuminant. The distance threshold may be set as needed.

The virtual illuminant may have a default position in the virtual scene. The default position of the virtual illuminant in the virtual scene may be referred to as a preset illuminant position. The virtual illuminant may further have default direction information. The default direction information may be referred to as preset direction information. Default posture information of the virtual illuminant in the virtual scene includes the preset illuminant position and the preset direction information. The default posture information may be referred to as preset posture information. The virtual illuminant may further have default illumination information, and the default illumination information may be referred to as preset illumination information. The current object position is a position of the virtual object in the virtual scene at a current time point. The posture information of the target virtual illuminant varies with the movement of the virtual object. In a case that the virtual object is located at the preset object position, the posture information of the target virtual illuminant is the preset posture information.

Specifically, the terminal may determine, according to a binding relationship between the virtual illuminant and the virtual object, whether the virtual illuminant is the virtual illuminant whose posture varies with the movement of the virtual object. In a case that the binding relationship is that the virtual illuminant is bound to the virtual object, it is determined that the virtual illuminant is the virtual illuminant whose posture varies with the movement of the virtual object. In a case that the binding relationship is that the virtual illuminant is not bound to the virtual object, it is determined that the virtual illuminant is not the virtual illuminant whose posture varies with the movement of the virtual object. The binding relationship between the virtual illuminant and the virtual object may be preset or modified as needed.

Figure 3:
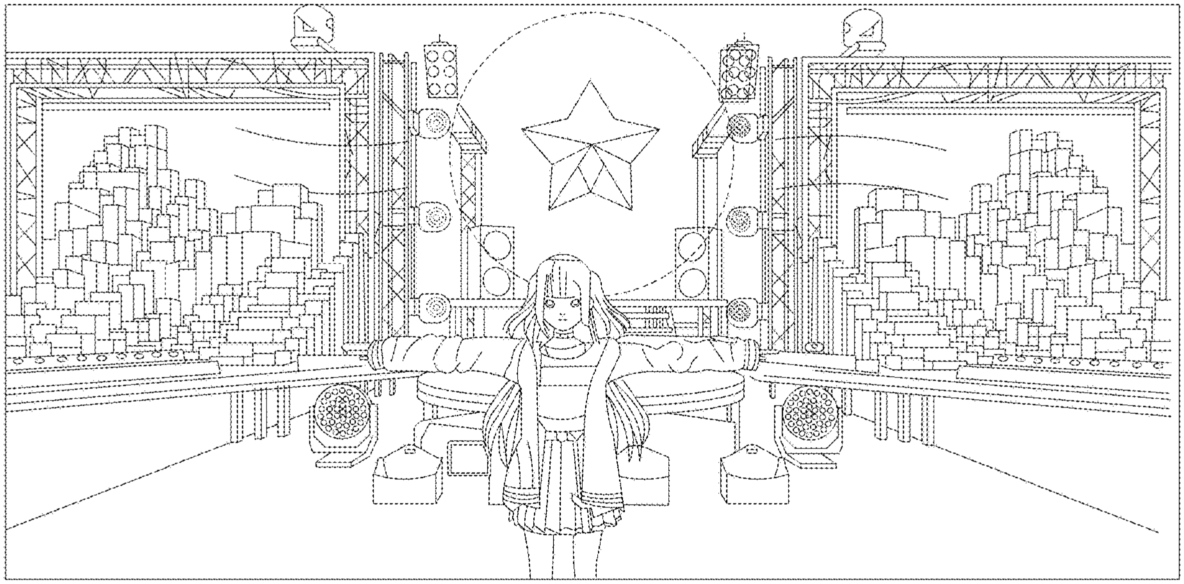
FIG. 3 is a schematic diagram of a virtual scene according to some embodiments.

In some embodiments, the virtual scene includes one or more preset spatial areas bound to the virtual object. The preset spatial area may be a geometric body of any shape, such as a sphere, a cube, or a cone. The preset spatial area is a spatial area at a specified position in the virtual scene. The preset spatial area only represents that a position is not marked in the virtual scene. A stage scene is used as an example. FIG. 3 shows a virtual stage scene, and a preset spatial area may be at least one of a middle spatial area, a left spatial area, or a right spatial area in the stage scene. A specific position of the preset spatial area is not limited in this disclosure. The preset spatial area may be bound to at least one virtual illuminant, and whether the preset spatial area is bound to the virtual illuminant may be set as needed. Each virtual illuminant bound to the preset spatial area is used to enable the virtual object to present a specific illumination effect in a case that the virtual object is in the preset spatial area. When the preset spatial area is different, the specific illumination effect presented by the virtual object in the preset spatial area may be the same or may be different. In a case that each virtual illuminant bound to one preset spatial area is different from each virtual illuminant bound to another preset spatial area, specific illumination effects presented by the virtual objects in the two preset spatial areas are different. A posture of the virtual illuminant bound to the preset spatial area varies with the movement of the virtual object bound to the preset spatial area.

In some embodiments, the terminal may determine whether the virtual object is in the preset spatial area according to the current object position. In a case that it is determined that the virtual object is located in any preset spatial area, the preset spatial area in which the virtual object is located may be referred to as a target spatial area. The terminal may determine at least one target virtual illuminant based on each virtual illuminant bound to the target spatial area. For example, each virtual illuminant bound to the target spatial area may be determined as the target virtual illuminant.

Operation 206: Determine reference posture information, where the reference posture information is posture information of the target virtual illuminant in a case that the virtual object is located at a reference object position. For example, reference pose data for the target virtual light source is determined based on a reference position of the virtual object.

The reference object position may be a preset object position of the virtual object, or may be a position of the virtual object before the virtual object moves. The reference posture information is the posture information of the target virtual illuminant in a case that the virtual object is located at the reference object position. For example, in a case that the reference object position is the preset object position of the virtual object, the reference posture information may be preset posture information of the virtual illuminant. In a case that the reference object position is the position of the virtual object before the virtual object moves, the reference posture information may be posture information of the virtual illuminant before the virtual object moves.

Specifically, the reference posture information may include a reference illuminant position and a reference illuminant direction. The reference illuminant position is a position of the target virtual illuminant in a case that the virtual object is located at the reference object position. The reference illuminant direction is a direction of the target virtual illuminant in a case that the virtual object is located at the reference object position. In this disclosure, in a case that the virtual object is located at the preset object position, the posture information of the target virtual illuminant is the preset posture information. In a case that the position of the virtual object moves from the preset object position to another position, the posture information of the target virtual illuminant may be updated based on the preset posture information, so that a posture of the target virtual illuminant varies with the movement of the virtual object. In this way, in a case that the reference object position is the preset object position, the reference illuminant position is the preset posture information. The reference illuminant position is a preset illuminant position of the target virtual illuminant, and the reference illuminant direction is a preset illuminant direction of the target virtual illuminant.

Operation 208: Determine a posture offset produced for the target virtual illuminant when the virtual object changes from a preset reference object position to the current object position, and update the reference posture information by using the posture offset, to obtain target posture information of the target virtual illuminant. For example, a pose offset for the target virtual light source is calculated based on the movement of the virtual object from the reference position to the current position. The reference pose data is updated based on the pose offset to obtain target pose data for the target virtual light source.

Specifically, the terminal may determine the posture offset produced for the target virtual illuminant when the virtual object changes from the reference object position to the current object position, and update the reference posture information by using the posture offset, to obtain the target posture information of the target virtual illuminant.

In some embodiments, the posture offset may include at least one of a position offset or a direction offset. The terminal may update the reference illuminant position in the reference posture information by using the position offset, or update the reference illuminant direction in the reference posture information by using the direction offset, and determine the updated reference posture information as the target posture information of the target virtual illuminant.

In some embodiments, the terminal may determine, based on a preset illumination mode, the posture offset produced for the target virtual illuminant when the virtual object changes from the reference object position to the current object position. The preset illumination mode includes a light chasing mode and a non-light chasing mode. In the light chasing mode, the position of the target virtual illuminant remains unchanged, and the direction of the target virtual illuminant varies with the movement of the virtual object. In the non-light chasing mode, the direction of the target virtual illuminant remains unchanged, and the position of the target virtual illuminant varies with the movement of the virtual object. Therefore, in the light chasing mode, the terminal may determine the direction offset produced for the target virtual illuminant when the virtual object changes from the reference object position to the current object position, and update the reference illuminant direction in the reference posture information by using the direction offset, to obtain the target posture information of the target virtual illuminant. In the non-light chasing mode, the terminal may determine the position offset produced for the target virtual illuminant when the virtual object changes from the reference object position to the current object position, and update the reference illuminant position in the reference posture information by using the position offset, to obtain the target posture information of the target virtual illuminant.

In some embodiments, the posture of the target virtual illuminant may vary with the movement of the virtual object, and may further vary with switching of a viewing angle of the virtual scene. The viewing angle of the virtual scene refers to a viewing angle used when the virtual scene is observed. The virtual scene has a first virtual camera and a second virtual camera. The reference posture information is the posture information of the target virtual illuminant under a viewing angle of the first virtual camera when the virtual object is located at the reference object position. Under a viewing angle of the second virtual camera, the terminal determines the posture offset produced for the target virtual illuminant when the virtual object changes from the reference object position to the current object position, and updates the reference posture information by using the posture offset, to obtain object update posture information of the target virtual illuminant. Under the viewing angle of the second virtual camera, the terminal updates the object update posture information based on a position of the first virtual camera and a position of the second virtual camera, to obtain the target posture information of the target virtual illuminant. A virtual camera is a camera in the virtual scene, such as a camera in a game, which can capture a corresponding game image. In one camera system, a plurality of cameras may simultaneously exist. Content observed by one camera may be used as a main body image in the game image. According to an actual design requirement, the camera may be switched at an appropriate time point. For example, content observed by the first virtual camera is a main body image in the virtual scene.

Operation 210: Obtain illumination information that is of the target virtual illuminant and that is configured for rendering to obtain target illumination information, and perform illumination rendering on the virtual object by using target illumination information and the target posture information of the at least one target virtual illuminant. For example, target illumination data is obtained based on illumination data of the target virtual light source. The illumination for the virtual object is rendered based on the target illumination data and the target pose data of the target virtual light source.

The target virtual illuminant has reference illumination information, and the reference illumination information refers to: the illumination information of the target virtual illuminant in a case that the virtual object is located at the reference object position. If the reference object position is the preset object position, the reference illumination information is default illumination information of the target virtual illuminant, and the default illumination information may be referred to as the preset illumination information. The target illumination information may be the reference illumination information, or the target illumination information may be illumination information obtained by updating the reference illumination information.

Specifically, the illumination information includes an illumination intensity. In a case that a distance between the target virtual illuminant and the virtual object changes, an illumination intensity of the target virtual illuminant may also change correspondingly. Certainly, in a case that the distance between the target virtual illuminant and the virtual object changes, the illumination intensity of the target virtual illuminant may also remain unchanged, that is, remain at a default illumination intensity. Whether the illumination intensity of the target virtual illuminant varies with the distance may be set as needed. An example in which the virtual scene is the game scene is used. Settings may be made by using a tool or an illumination option provided by a game engine. The terminal may perform illumination rendering on the virtual object by using the target illumination information and the target posture information of the target virtual illuminant, to obtain an image of the virtual scene, and may display a rendered image. The target virtual illuminant illuminates the virtual object in the rendered image, so that the virtual object presents a corresponding illumination effect. In a case that the target virtual illuminant is a virtual lamp, the virtual object presents a corresponding light effect.

In some embodiments, the terminal may update, according to the target posture information, the reference illumination information of the target virtual illuminant, to obtain the target illumination information of the target virtual illuminant, and perform illumination rendering on the virtual object by using the target illumination information and the target posture information.

In some embodiments, the target illumination information of the target virtual illuminant is the reference illumination information of the target virtual illuminant. The terminal may use the target illumination information of the target virtual illuminant as the reference illumination information of the target virtual illuminant, and perform illumination rendering on the virtual object by using the reference illumination information and the target posture information.

In the foregoing illumination control method, at least one target virtual illuminant is determined based on the current object position to which the virtual object moves in the virtual scene. The target virtual illuminant is a virtual illuminant whose posture varies with the movement of the virtual object in the virtual scene, and the reference posture information is the posture information of the target virtual illuminant in a case that the virtual object is located at the reference object position, to determine the posture offset produced for the target virtual illuminant when the virtual object changes from the preset reference object position to the current object position, and update the reference posture information by using the posture offset, to obtain the target posture information of the target virtual illuminant, so that the target posture information represents the posture information of the target virtual illuminant after the posture information varies with the movement of the virtual object. Further, illumination rendering is performed on the virtual object by using the target illumination information and the target posture information of the target virtual illuminant, thereby reducing a change in an illumination effect produced by the target virtual illuminant on the virtual object during the movement of the virtual object, reducing a case that the virtual object presents an abnormal illumination effect during the movement, and improving the illumination effect.

An example of a stage light effect in the virtual scene is used. In a related technology, dynamic trajectories of all lights are based on pre-set light animation. An illumination manner is fixed. A scene light effect is first determined, and then dance movement of a virtual character on the stage is considered, but a light effect of the virtual character moving at different positions cannot be guaranteed. As a result, the virtual character may walk out of a light area, or be illuminated by a strange light effect, resulting in a poor light effect. The illumination control method provided in this disclosure may implement automatic control on the light according to a position of the virtual character, which may improve reproduction of the light effect of the stage performance.

In addition, in the related technology, for a solution of performing illuminating by using a virtual light, illuminating is performed in a manual manner, and then a movement manner of the light is arranged in advance according to an actual condition. When the light is needed, the light is manually triggered. An illuminating process takes a long time, which occupies more computer resources. The illumination control method provided in this disclosure may implement automatic control on the light according to the position of the virtual character, thereby improving illuminating efficiency, shortening illuminating duration, and saving computer resources.

In some embodiments, the reference posture information includes a reference illuminant position and a reference illuminant direction. The determining a posture offset produced for the target virtual illuminant when the virtual object changes from a preset reference object position to the current object position, and updating the reference posture information by using the posture offset, to obtain target posture information of the target virtual illuminant includes: obtaining a direction pointing from the reference illuminant position to the reference object position, to obtain a first direction; obtaining a direction pointing from the reference illuminant position to the current object position, to obtain a second direction; determining an offset between the first direction and the second direction, to obtain a first direction offset; and offsetting the reference illuminant direction in the reference posture information by using the first direction offset, to obtain the target posture information of the target virtual illuminant.

The reference illuminant position is a position of the target virtual illuminant in a case that the virtual object is located at the reference object position. The reference illuminant direction is a direction of the target virtual illuminant in a case that the virtual object is located at the reference object position. In a case that the virtual object is located at the preset object position, the posture information of the target virtual illuminant is the preset posture information. In this way, in a case that the reference object position is the preset object position, the reference illuminant position is the preset posture information. The reference illuminant position is the preset illuminant position of the target virtual illuminant, and the reference illuminant direction is the preset illuminant direction of the target virtual illuminant.

The first direction is a direction pointing from the reference illuminant position to the reference object position. For example, the first direction may be represented by a direction of a vector whose starting point is the reference illuminant position and whose end point is the reference object position. The second direction is a direction pointing from the reference illuminant position to the current object position. For example, the second direction may be represented by a direction of a vector whose starting point is the reference illuminant position and whose end point is the current object position. The first direction offset refers to an angle required to rotate from the first direction to the second direction.

Specifically, in the light chasing mode, the terminal may obtain the direction pointing from the reference illuminant position to the reference object position, to obtain the first direction, and obtain the direction pointing from the reference illuminant position to the current object position, to obtain the second direction. The terminal may calculate an angle between the first direction and the second direction, determine the angle as the first direction offset, and rotate the reference illuminant direction by the first direction offset, to obtain a rotated illuminant direction, replace the reference illuminant direction in the reference posture information with the rotated illuminant direction, determine the reference posture information after replacing the reference illuminant direction as the object update posture information, and determine the target posture information of the target virtual illuminant according to the object update posture information. Under a viewing angle of the second virtual camera, the terminal may further update the object update posture information based on a position of the first virtual camera and a position of the second virtual camera, to obtain the target posture information of the target virtual illuminant.

In some embodiments, the terminal may determine the object update posture information as the target posture information of the target virtual illuminant. For example, if the reference illuminant direction is R1, the reference illuminant position is P1, the reference object position is P2, and the current object position is P3, the terminal calculates the direction from P1 to P2, to obtain the first direction, calculates the direction from P1 to P3, to obtain the second direction, and calculates a deviation between the first direction and the second direction, to obtain the first direction offset R1. The rotated illuminant direction may be expressed as R1+R2, thereby obtaining an angle, namely, direction correction. In a case that there is a plurality of target virtual illuminants, the rotated illuminant direction that is calculated in this embodiment may be used to modify the angle, namely, the direction, of each target virtual illuminant, to obtain the target posture information respectively corresponding to each target virtual illuminant.

In this embodiment, the reference illuminant direction is offset by the first direction offset, so that during the movement of the virtual object, an orientation of the target virtual illuminant rotates following the movement of the virtual object, showing a phenomenon that the light follows the virtual object. That is, a light chasing effect is presented. This reduces, during the movement of the virtual object, an illumination change produced by the target virtual illuminant on the virtual object, thereby reducing a case of an abnormal illumination effect caused by the virtual object moving out of an illumination range, and improving the illumination effect. Automatic adjustment of the direction of the virtual illuminant is implemented, so that efficiency of adjusting the direction of the virtual illuminant is improved, thereby reducing computer resources consumed in a process of adjusting the direction of the virtual illuminant.

In some embodiments, the reference posture information includes a reference illuminant position. The determining a posture offset produced for the target virtual illuminant when the virtual object changes from a preset reference object position to the current object position, and updating the reference posture information by using the posture offset, to obtain target posture information of the target virtual illuminant includes: determining a position offset between the current object position and the reference object position; and offsetting the reference illuminant position in the reference posture information by using the position offset, to obtain the target posture information of the target virtual illuminant.

Specifically, the position offset refers to an offset of positions from the reference object position to the current object position. In the non-light chasing mode, the terminal may calculate a position difference between the current object position and the reference object position, determine the position difference as the position offset, perform summation calculation on the reference illuminant position and the position offset, determine a result of the summation calculation as an offset illuminant position, replace the reference illuminant position in the reference posture information by using the offset illuminant position, determine the reference posture information after replacing the reference illuminant position as the object update posture information, and determine the target posture information of the target virtual illuminant according to the object update posture information. For example, the terminal may determine the object update posture information as the target posture information of the target virtual illuminant. In a case that there is a plurality of target virtual illuminants, the terminal may determine, by using the method of this embodiment, the target posture information respectively corresponding to each target virtual illuminant. Under a viewing angle of the second virtual camera, the terminal may further update the object update posture information based on a position of the first virtual camera and a position of the second virtual camera, to obtain the target posture information of the target virtual illuminant.

In some embodiments, in a case that there are a plurality of target virtual illuminants, the terminal may consider the plurality of target virtual illuminants as a whole, for example, form the plurality of target virtual illuminants into one virtual illuminant group, determine a reference group position of the virtual illuminant group according to reference illuminant positions respectively corresponding to the plurality of target virtual illuminants, for example, may collect statistics, such as perform mean calculation, on three-dimensional coordinates of the reference illuminant positions respectively corresponding to the target virtual illuminants, and determine a position represented by the calculated new three-dimensional coordinates as the reference group position. After the reference group position is determined, the reference illuminant position may be expressed by using the reference group position. For example, reference illuminant position=reference group position+P, where P=reference illuminant position−reference group position. The position may be expressed in the three-dimensional coordinates. In this way, the reference group position is changed, so that the reference illuminant positions respectively corresponding to the target virtual illuminants may be changed. Specifically, the terminal may offset the reference group position by the position offset, to obtain an offset reference group position, and replace the reference group position in the reference illuminant position by using the offset reference group position, thereby achieving an objective of offsetting the reference illuminant position by the position offset, to obtain an offset illuminant position. For example, if the reference group position is A1, a coordinate of the reference object position is P2, and an index of the current object position is P3, a coordinate of the offset reference group position is A1+(P3−P2). Offset illuminant position=offset reference group position+P.

In this embodiment, the reference illuminant position is offset by the position offset, so that a relative position between the target virtual illuminant and the virtual object remains unchanged during the movement of the virtual object. This reduces an illumination change produced by the target virtual illuminant on the virtual object during the movement of the virtual object, thereby reducing a case of the abnormal illumination effect caused by the virtual object moving out of the illumination range, and improving the illumination effect. Automatic adjustment of the position of the virtual illuminant is implemented, so that efficiency of adjusting the position of the virtual illuminant is improved, thereby reducing computer resources consumed in a process of adjusting the position of the virtual illuminant.

In some embodiments, the virtual scene has a first virtual camera and a second virtual camera. The reference posture information is the posture information of the target virtual illuminant under a viewing angle of the first virtual camera when the virtual object is located at the reference object position. The updating the reference posture information by using the posture offset, to obtain target posture information of the target virtual illuminant includes: updating the reference posture information by using the posture offset, to obtain object update posture information of the target virtual illuminant; and under a viewing angle of the second virtual camera, updating the object update posture information based on a position of the first virtual camera and a position of the second virtual camera, to obtain the target posture information of the target virtual illuminant.

The posture information of the target virtual illuminant varies with the switching of the viewing angle.

Specifically, under the viewing angle of the first virtual camera, the terminal determines the posture offset produced for the target virtual illuminant when the virtual object changes from the reference object position to the current object position, and updates the reference posture information by using the posture offset, to obtain object update posture information of the target virtual illuminant. Under the viewing angle of the second virtual camera, the terminal may further update the object update posture information based on the position of the first virtual camera and the position of the second virtual camera, to obtain the target posture information of the target virtual illuminant.

In this embodiment, in response to switching from the viewing angle of the first virtual camera to the viewing angle of the second virtual camera, the object update posture information is updated based on the position of the first virtual camera and the position of the second virtual camera, to obtain the target posture information of the target virtual illuminant. In this way, in a case that the viewing angle is switched, the target virtual illuminant may vary with the viewing angle, so that an illumination effect of the virtual object observed at the switched viewing angle is consistent with an illumination effect of the virtual object observed at a viewing angle before the switching. This reduces a difference between the illumination effect of the virtual object observed at the switched viewing angle and the illumination effect of the virtual object observed at the viewing angle before the switching, thereby reducing a case of an abnormal illumination effect due to viewing angle switching, improving the illumination effect, and being capable of reproducing the illumination effect. An example of a stage light is used. Movement of a character and switching of a camera may lead to a poor light effect. Both the moving character and the moving camera may lead to the poor light effect. In this embodiment, the light is automatically controlled through the movement of the character and the switching of the camera, which can well ensure the reproduction of the light effect on the stage. The light is automatically controlled through the movement of the character and the switching of the camera, so that efficiency of adjusting the posture of the virtual illuminant is improved, thereby reducing computer resources consumed in the process of adjusting the posture of the virtual illuminant.

In some embodiments, the updating the object update posture information based on a position of the first virtual camera and a position of the second virtual camera, to obtain the target posture information of the target virtual illuminant includes: determining a direction pointing from the position of the first virtual camera to the current object position, to obtain a third direction; determining a direction pointing from the position of the second virtual camera to the current object position, to obtain a fourth direction; determining an offset between the third direction and the fourth direction, to obtain a second direction offset; and updating the object update posture information based on the second direction offset, to obtain the target posture information of the target virtual illuminant.

The position of the second virtual camera is the position of the second virtual camera. The third direction is a direction pointing from the position of the first virtual camera to the current object position, and the fourth direction is a direction pointing from the position of the second virtual camera to the current object position. The second direction offset refers to a deviation between the third direction and the fourth direction. For example, the second direction offset may be an angle that needs to rotate from the fourth direction to the third direction.

Specifically, the terminal may rotate the target virtual illuminant by the second direction offset with the current object position as a rotation center, and determine a position and a direction of the rotated target virtual illuminant, update an illuminant position in the object update posture information by using a position of the rotated target virtual illuminant, update an illuminant direction in the object update posture information by using a direction of the rotated target virtual illuminant, and determine the updated object update posture information as the target posture information of the target virtual illuminant.

In some embodiments, in a case that there is a plurality of target virtual illuminants, the terminal may consider the plurality of target virtual illuminants as a whole, for example, form the plurality of target virtual illuminants into one virtual illuminant group. The terminal may rotate the virtual illuminant group by the second direction offset with the current object position as the rotation center, to determine the position and the direction of the rotated virtual illuminant group, update the illuminant position in the object update posture information by using the position of the rotated virtual illuminant group, update the illuminant direction in the object update posture information by using the direction of the rotated virtual illuminant group, and determine the updated object update posture information as the target posture information of the target virtual illuminant.

In this embodiment, the object update posture information is updated based on the second direction offset, to obtain the target posture information of the target virtual illuminant. In this way, the target virtual illuminant may vary with the viewing angle, so that an illumination effect of the virtual object observed at the switched viewing angle is consistent with an illumination effect of the virtual object observed at a viewing angle before the switching. This reduces a difference between the illumination effect of the virtual object observed at the switched viewing angle and the illumination effect of the virtual object observed at the viewing angle before the switching, thereby reducing a case of an abnormal illumination effect due to viewing angle switching, improving the illumination effect, and being capable of reproducing the illumination effect. The posture of the target virtual illuminant is automatically adjusted according to the switching of the viewing angle, so that efficiency of adjusting the posture of the virtual illuminant is improved, thereby reducing computer resources consumed in the process of adjusting the posture of the virtual illuminant.

In some embodiments, the virtual scene includes at least one preset spatial area bound to the virtual object, and each preset spatial area is bound to at least one virtual illuminant in the virtual scene. The determining at least one target virtual illuminant based on the current object position includes: when determining, according to the current object position, that the virtual object moves to any preset spatial area bound to the virtual object, determining the at least one target virtual illuminant from each virtual illuminant bound to the preset spatial area to which the virtual object moves.

A quantity of preset spatial areas may be one or more, and a plurality refers to at least two. A target spatial area is a preset spatial area in which the virtual object is located. In a stage scene, the virtual scene may be referred to as a performance space, the preset spatial area may be referred to as a performance space volume, and the performance space volume refers to a spatial area in the performance space.

Specifically, the terminal may determine each virtual illuminant bound to the target spatial area as the target virtual illuminant. Alternatively, the terminal may determine, according to a binding relationship between the virtual illuminant and the virtual object, the target virtual illuminant from each virtual illuminant bound to the target spatial area. For each virtual illuminant bound to the target spatial area, in a case that the terminal determines that the virtual illuminant is bound to the virtual object, the terminal determines the virtual illuminant as the target virtual illuminant.

In some embodiments, the terminal may determine, according to a quantity of collisions between the ray emitted from the current object position and each preset spatial area, whether the virtual object is located in the preset spatial area. In a case of determining that the virtual object is located in the preset spatial area, the terminal determines the preset spatial area in which the virtual object is located from each preset spatial area, to obtain the target spatial area.

In this embodiment, the virtual illuminant bound to the preset spatial area may illuminate the preset spatial area, so that the virtual object in the preset spatial area may present an illumination effect with characteristics. In a case that the virtual object moves to the target spatial area, the target virtual illuminant is determined according to the virtual illuminant bound to the target spatial area. In this way, in a case that the virtual object moves to the target spatial area, the virtual illuminant bound to the target spatial area is triggered to illuminate the virtual object, so that the virtual object may produce a specific illumination effect in the target spatial area, thereby improving the illumination effect. In addition, the target virtual illuminant is determined by the preset spatial area, so that the target virtual illuminant may be determined quickly, thereby reducing computer resources consumed in the process of determining the target virtual illuminant.

In some embodiments, the method further includes: emitting a ray in any direction from a current object position of the virtual object; determining a total quantity of collisions between the ray and each preset spatial area bound to the virtual object; and when determining, based on the total quantity of collisions, that the virtual object is located in the preset spatial area to which the virtual object is bound, determining that the virtual object moves to a preset spatial area in which the ray collides for the first time.

Figure 4:
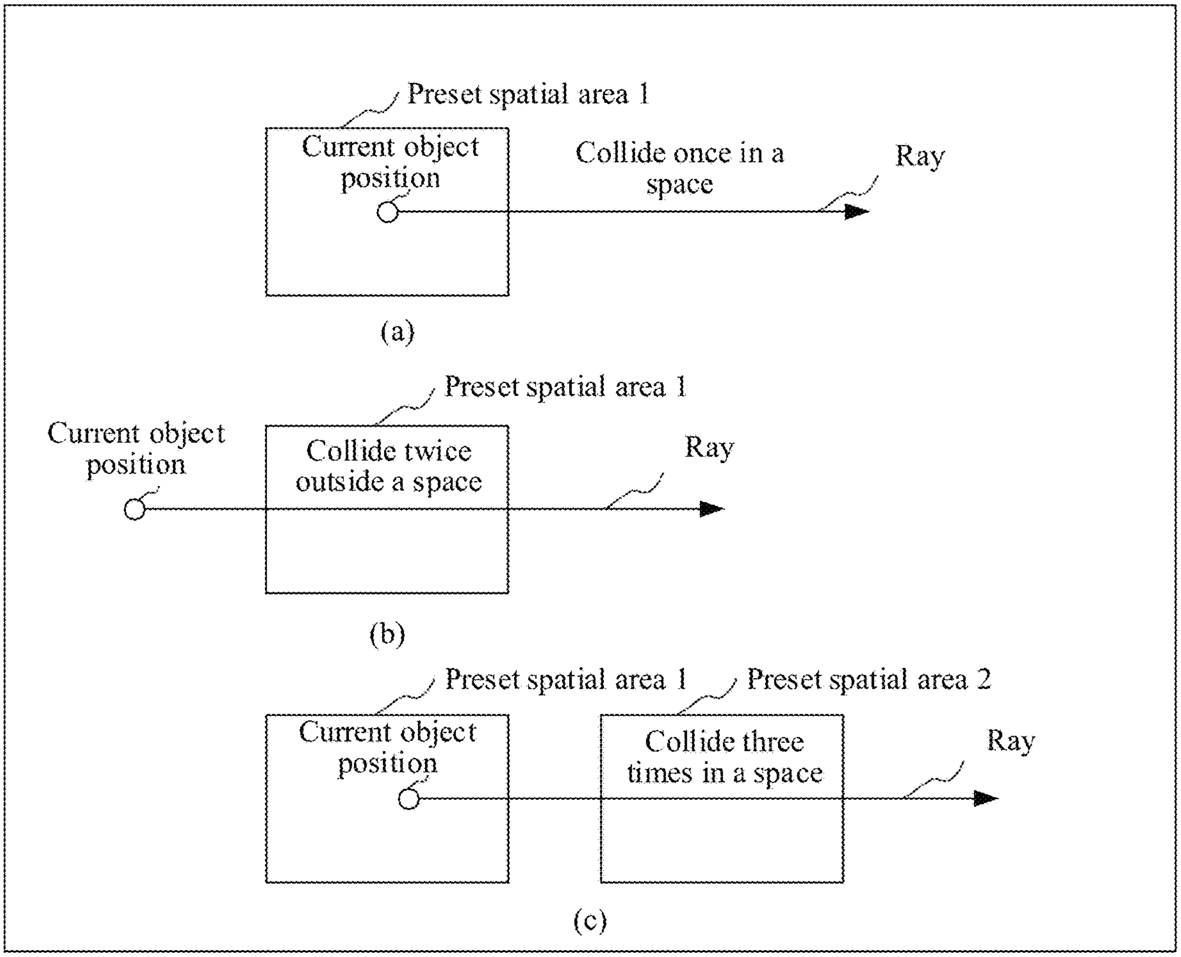
FIG. 4 is a principle diagram of collision according to some embodiments.

The ray may be a ray emitted in any direction from the current object position. The collision means that the ray intersects with the preset spatial area. An example in which the preset spatial area is a cube is used. The collision means that the ray intersects with a surface of the cube. The total quantity of collisions refers to a total quantity of intersections between the ray and each preset spatial area. As shown in (a) in FIG. 4, a circle represents a current object position, and a line with a joint represents a ray. The ray only intersects with a preset spatial area 1 in a virtual scene, and a virtual object is in the preset spatial area 1. It may be learnt that, the ray has only one intersection point with the preset spatial area 1. Therefore, a total quantity of collisions is one. As shown in (b) in FIG. 4, the ray only intersects with the preset spatial area 1, and the virtual object is outside the preset spatial area 1. It may be learnt that, the ray has two intersection points with the preset spatial area 1. Therefore, a total quantity of collisions is two. As shown in (c) in FIG. 4, the ray intersects with the preset spatial area 1 and a preset spatial area 2, and the virtual object is in the preset spatial area 1. It may be learnt that, the ray has one intersection point with the preset spatial area 1, and the ray has two intersection points with the preset spatial area 2. Therefore, a total quantity of collisions is 1+2=3.

Specifically, the terminal may emit a ray in any direction from the current object position of the virtual object, to determine the total quantity of collisions between the ray and each preset spatial area bound to the virtual object. In a case that the total quantity of collisions is an odd number, it is determined that the virtual object is located in the preset spatial area bound to the virtual object; and in a case that the total quantity of collisions is an even number, it is determined that the virtual object is located outside the preset spatial area bound to the virtual object. As shown in (a) and (c) in FIG. 4, the total quantity of collisions is the odd number, and the virtual object is in the preset spatial area 1. As shown in (b) in FIG. 4, the total quantity of collisions is the even number, and the virtual object is outside the preset spatial area.

In some embodiments, in a case that it is determined that the virtual object is located in the preset spatial area bound to the virtual object, the terminal may determine the preset spatial area with which the ray collides for the first time as the target spatial area. That is, the terminal determines the preset spatial area with which the ray intersects for the first time as the target spatial area. For example, in (a) and (c) in FIG. 4, the preset spatial area 1 is the target spatial area.

In this embodiment, whether the virtual object is located in the preset spatial area bound to the virtual object is determined based on the total quantity of collisions. This improves accuracy and efficiency of determining whether the virtual object is located in the preset spatial area bound to the virtual object. The preset spatial area in which the virtual object is located may be simply and accurately determined through the total quantity of collisions, thereby reducing computer resources consumed in the process of determining the preset spatial area in which the virtual object is located.

In some embodiments, the method further includes: when determining, based on the total quantity of collisions, that the virtual object is located outside the preset spatial area to which the virtual object is bound, performing illumination rendering on the virtual object based on preset illumination information and preset posture information of a preset virtual illuminant in the virtual scene.

The preset virtual illuminant may be any virtual illuminant in the virtual scene. The preset virtual illuminant may be bound to the preset spatial area, or may not be bound to the preset spatial area.

Specifically, in a case that the total quantity of collisions is the even number, the terminal determines that the virtual object is located outside the preset spatial area to which the virtual object is bound. In a case that the virtual object is not located in any preset spatial area, during movement of the virtual object, the terminal may perform illumination rendering on the virtual object based on the preset illumination information and the preset posture information of the preset virtual illuminant in the virtual scene, and a posture, illumination information, and the like of the preset virtual illuminant remain unchanged. When it is determined, based on the total quantity of collisions, that the virtual object is located outside the preset spatial area to which the virtual object is bound, that is, in a case of determining that the virtual object is not located in any preset spatial area, the terminal may perform illumination rendering on the virtual object by using the preset illumination information and preset position information of the preset virtual illuminant in the virtual scene. In a case that the virtual object is not located in any preset spatial area, during the movement of the virtual object, the illumination information of the preset virtual illuminant remains as the preset illumination information and the position information remains as the preset position information.

In some embodiments, when determining, based on the total quantity of collisions, that the virtual object is located outside the preset spatial area to which the virtual object is bound, the terminal may perform illumination rendering on the virtual object based on the preset illumination information and the preset posture information of the preset virtual illuminant in the virtual scene, and the posture and the illumination information of the preset virtual illuminant vary with the movement of the virtual object.

In this embodiment, when it is determined, based on the total quantity of collisions, that the virtual object is located outside the preset spatial area to which the virtual object is bound, illumination rendering is performed on the virtual object based on the preset illumination information and the preset posture information of the preset virtual illuminant in the virtual scene. That is, in a case that the virtual object is located outside the preset spatial area, the posture and the illumination information of the virtual illuminant remain unchanged, and the posture of the virtual illuminant is triggered to change when the preset spatial area is entered. In this way, the virtual object presents different illumination animation effects in the preset spatial area and outside the preset spatial area, thereby improving an illumination effect. An illumination effect of a stage may be improved when the illumination animation effects are applied to the stage. In addition, through the preset illumination information and the preset posture information, illumination rendering is performed on the virtual object, and when the virtual object is located outside the preset spatial area bound to the virtual object, illumination rendering is performed quickly. This improves efficiency of illumination rendering, and reduces computer resources consumed by illumination rendering.

In some embodiments, the obtaining illumination information that is of the target virtual illuminant and that is configured for rendering to obtain target illumination information includes: determining reference illumination information of the target virtual illuminant, where the reference illumination information is the illumination information of the target virtual illuminant when the virtual object is located at the reference object position; and updating, according to the target posture information, the reference illumination information of the target virtual illuminant, to obtain the target illumination information of the target virtual illuminant.

The reference illumination information is the illumination information of the target virtual illuminant in a case that the virtual object is located at the reference object position. A position of the target virtual illuminant that is recorded in the target posture information may be referred to as a target illuminant position.

Specifically, the terminal may update at least one of an illumination intensity or an illumination color in the reference illumination information of the target virtual illuminant according to the target posture information, to obtain the target illumination information of the target virtual illuminant, and then perform illumination rendering on the virtual object by using the target illumination information and the target posture information.

In some embodiments, the terminal may determine an intensity update coefficient according to a distance between the target illuminant position and the current object position and a distance between a reference illuminant position and the reference object position, adjust a reference illumination intensity by using the intensity update coefficient, to obtain a target illumination intensity, update the reference illumination intensity in the reference illumination information to the target illumination intensity, to obtain updated reference illumination information, and determine the updated reference illumination information as the target illumination information. The reference illuminant position refers to the position of the target virtual illuminant recorded in the reference posture information.

In this embodiment, because the target posture information represents a changed posture of the target virtual illuminant, the reference illumination information of the target virtual illuminant is updated according to the target posture information, to obtain the target illumination information of the target virtual illuminant. In this way, the illumination information is re-determined according to the changed posture, and the obtained target illumination information may be adapted to posture adjustment, thereby improving an illumination effect, and improving efficiency of the posture adjustment.

In some embodiments, the reference illumination information includes a reference illumination intensity; the reference posture information includes a reference illuminant position; and the target posture information includes a target illuminant position. The updating, according to the target posture information, the reference illumination information of the target virtual illuminant, to obtain the target illumination information of the target virtual illuminant includes: determining a distance between the reference illuminant position and the reference object position, to obtain a first distance; determining a distance between the target illuminant position and the current object position, to obtain a second distance; determining an intensity update coefficient based on the first distance and the second distance; and updating the reference illumination intensity in the reference illumination information by using the intensity update coefficient, to obtain the target illumination information of the target virtual illuminant.

The target illuminant position refers to the position of the target virtual illuminant recorded in the target posture information. The reference illuminant position refers to the position of the target virtual illuminant recorded in the reference posture information. The intensity update coefficient is used to update the illumination intensity.

Specifically, the intensity update coefficient is positively correlated to the second distance, and the intensity update coefficient is negatively correlated to the first distance. The terminal may multiply the reference illumination intensity by the intensity update coefficient, to obtain the target illumination intensity, and update the reference illumination intensity in the reference illumination information to the target illumination intensity, to obtain updated reference illumination information. The updated reference illumination information is the target illumination information.

In this embodiment, because a distance between the virtual object and a light source is different, and an illumination intensity on the virtual object is also different, the intensity update coefficient is determined based on the first distance and the second distance. This improves accuracy of the intensity update coefficient and efficiency of determining the intensity update coefficient, and reduces computer resources consumed in the process of determining the intensity update coefficient.

In some embodiments, the determining an intensity update coefficient based on the first distance and the second distance includes: obtaining the intensity update coefficient based on a ratio of the second distance to the first distance.

Under the target illumination intensity and the target illuminant position, an illumination intensity generated by the target virtual illuminant at the current object position is a first illumination intensity. Under the reference illumination intensity and the reference illuminant position, an illumination intensity generated by the target virtual illuminant at the reference object position is a second illumination intensity. The first illumination intensity is the same as the second illumination intensity.

Specifically, the ratio of the second distance to the first distance is positively correlated to the intensity update coefficient. The terminal may obtain the intensity update coefficient based on the ratio of the second distance to the first distance. For example, the terminal may use the ratio of the second distance to the first distance as the intensity update coefficient, or the terminal may use a square of the ratio of the second distance to the first distance as the intensity update coefficient.

In this embodiment, the intensity update coefficient is obtained based on the ratio of the second distance to the first distance, so that the reference illumination intensity may be updated according to the ratio of the second distance to the first distance, thereby improving update efficiency, and saving computer resources.

In some embodiments, the updating the reference illumination intensity in the reference illumination information by using the intensity update coefficient, to obtain the target illumination information of the target virtual illuminant includes: updating the reference illumination intensity by using the intensity update coefficient, to obtain a target illumination intensity; and updating the reference illumination intensity in the reference illumination information to the target illumination intensity, to obtain the target illumination information of the target virtual illuminant.

Specifically, the terminal may use a result obtained by multiplying the intensity update coefficient by the reference illumination intensity as the target illumination intensity, and replace the reference illumination intensity in the reference illumination information as the target illumination intensity, to obtain the target illumination information of the target virtual illuminant. For example, a calculation formula of the target illumination intensity is L2=Power (D2/D1, 2) L1. Power (D2/D1, 2)=$(D2/D1)^2$, where D1 represents the first distance, D2 represents the second distance, L1 represents the reference illumination intensity, and L2 represents the target illumination intensity.

Figure 5:
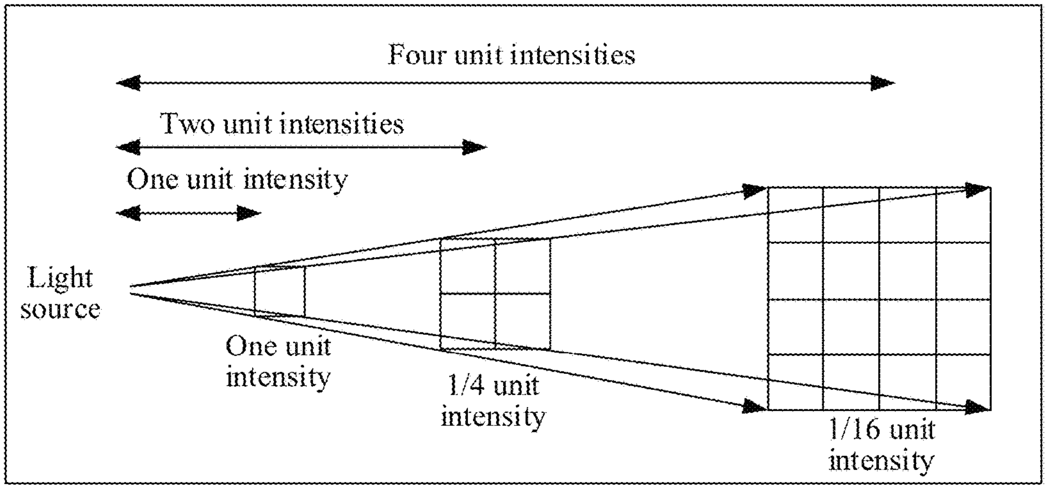
FIG. 5 is a principle diagram of attenuation of an illumination intensity according to some embodiments.

In this embodiment, during transmission of the light, the illumination intensity attenuates, for example, attenuates according to an inverse square law of light attenuation. FIG. 5 shows attenuation of the illumination intensity. It may be learnt from the figure that, the farther away from the light source, the smaller the illumination intensity. Therefore, when the distance between the virtual object and the target virtual illuminant changes, if the light intensity emitted by the target virtual illuminant remains unchanged, the illumination intensity on the virtual object changes. Therefore, in this disclosure, the reference illumination intensity is updated according to the intensity update coefficient, and the illumination intensity emitted by the target virtual illuminant is updated to the target illumination intensity, which may reduce a change of the illumination intensity on the virtual object, and improve the illumination effect. When the distance between the virtual object and the target virtual illuminant changes, the illumination intensity may be automatically updated, which improves efficiency of updating the illumination intensity, and reduces computer resources consumed in the process of updating the illumination intensity.

In some embodiments, the target virtual illuminant has a plurality of pieces of preset illumination information that are switched over time. The obtaining illumination information that is of the target virtual illuminant and that is configured for rendering to obtain target illumination information includes: obtaining, from a plurality of pieces of preset illumination information that are preconfigured for the target virtual illuminant and that are switched over time, preset illumination information of the target virtual illuminant at a current time point as the target illumination information.

Specifically, the terminal may determine the preset illumination information of the target virtual illuminant at the current time point, to obtain the reference illumination information, and determine the reference illumination information as the target illumination information, or update the reference illumination intensity through the intensity update coefficient, to obtain the target illumination intensity; and update the reference illumination intensity in the reference illumination information to the target illumination intensity, to obtain the target illumination information of the target virtual illuminant.

In some embodiments, the target virtual illuminant is a virtual illuminant bound to a target spatial area. The target spatial area may be bound to at least one group of virtual illuminants, and each group of virtual illuminants includes at least one virtual illuminant. Each group of virtual illuminants is used to present different illumination effects such as a light effect. In response to the virtual object moving to the target spatial area, the terminal triggers the virtual illuminant bound to the target spatial area to perform illuminating, so that the virtual object presents a specific light effect. Preset illumination information and preset posture information of each virtual illuminant in each group of virtual illuminants may vary over time or may be fixed.

In this embodiment, because preset illumination information of the target virtual illuminant varies over time, the target illumination information also varies over time, so that different illumination effects may be presented at different time points, thereby improving an illumination effect. The target illumination information is obtained from a plurality of pieces of preset illumination information pre-configured by the target virtual illuminant and switched over time, thereby improving efficiency of obtaining the target illumination information, and reducing the computer resources consumed in the process of obtaining the target illumination information.

Figure 6:
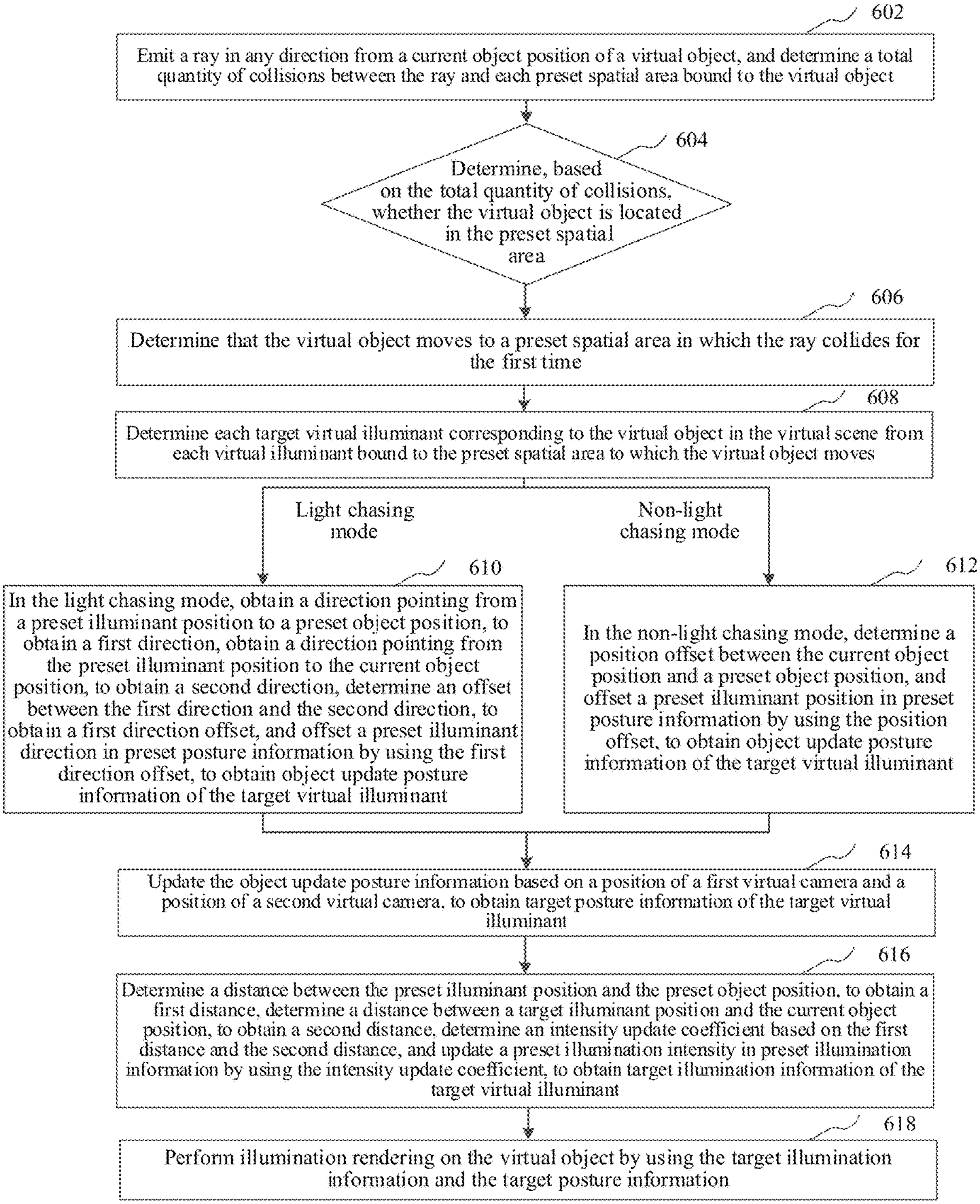
FIG. 6 is a schematic flowchart of an illumination control method according to some embodiments.

In some embodiments, as shown in FIG. 6, an illumination control method is provided. The method may be performed by a terminal or a server, or may be jointly performed by a terminal and a server. An example in which the method is applied to the terminal is used for description. The following operations are included.

Operation 602: Emit a ray in any direction from a current object position of a virtual object, and determine a total quantity of collisions between the ray and each of preset spatial areas bound to the virtual object. For example, a ray is emitted from the current position of the virtual object. A total number of intersections is determined between the ray and the plurality of predefined spatial areas.

Operation 602 may be performed in a case that the virtual object moves.

Operation 604: Determine, based on the total quantity of collisions, whether the virtual object is located in the preset spatial area, and if yes, perform operation 606. For example, based on the total number of intersections, when the virtual object is located in one of the plurality of predefined spatial areas, the predefined spatial area that the ray first intersects is identified as the particular predefined spatial area.

Figure 7:
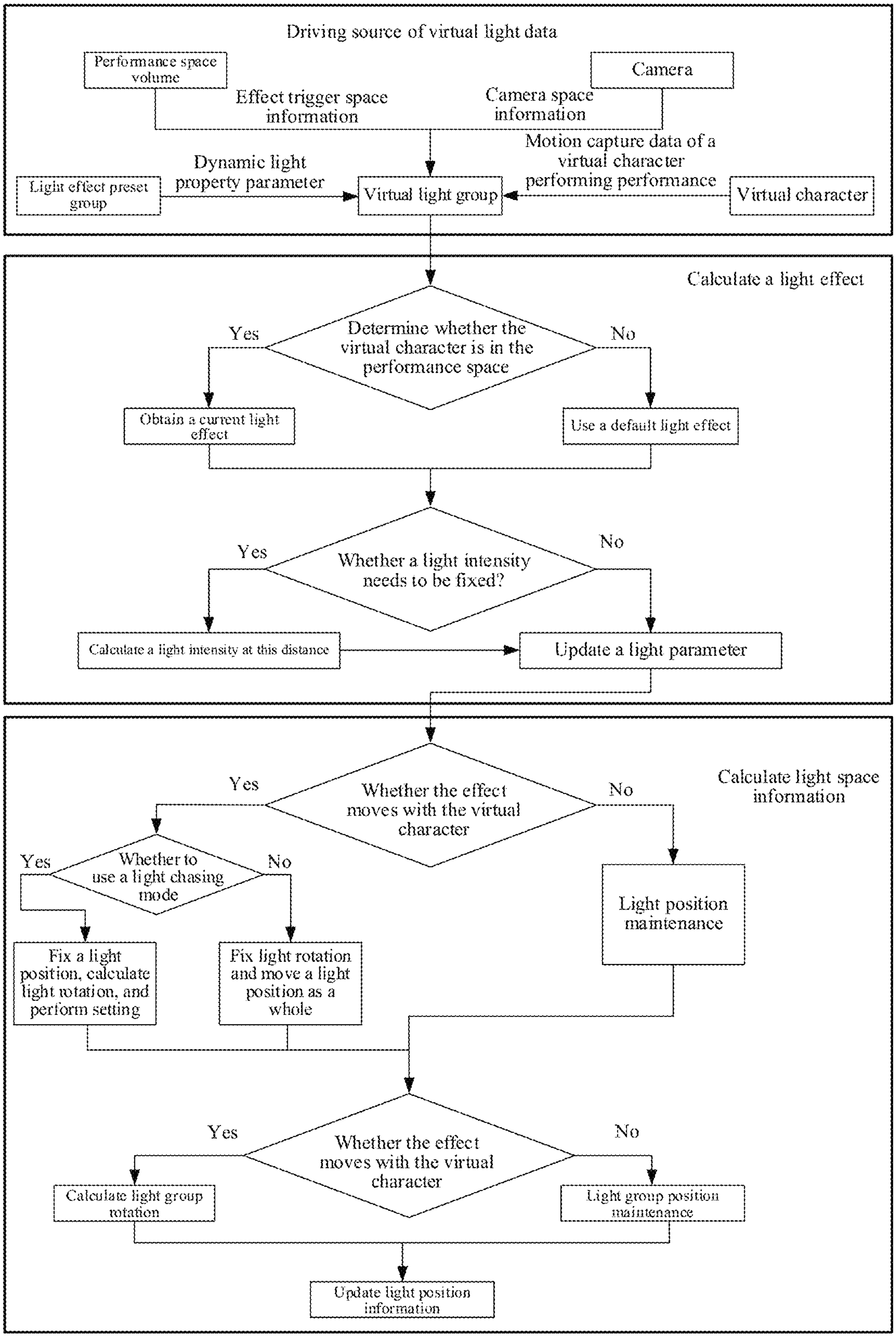
FIG. 7 is a schematic flowchart of an illumination control method according to some embodiments.

The preset spatial area is pre-set. FIG. 7 is a flowchart of an illumination control method in a stage scene according to some embodiments. A preset spatial area may be, for example, a performance space volume in FIG. 7. In FIG. 7, the performance space volume refers to different performance areas on the stage that are drawn by geometric bodies in a virtual three-dimensional scene. Information in the area includes a light effect preset that needs to be used when a character enters the area. In addition, the preset may also be switched in real time, to meet effect changes at different time points on the stage. In FIG. 7, a light effect preset group is used to create different light presets. The light presets include a virtual light instance that needs to be illuminated, a dynamic effect of a light, and a parameter of the light preset. For example, whether the light follows movement of a virtual character may be preset, and whether a camera direction is kept consistent. That the camera direction is consistent means that posture information of a target virtual illuminant is accordingly adjusted under a viewing angle of a non-first virtual camera.

Operation 606: Determine that the virtual object moves to a preset spatial area in which the ray collides for the first time.

Operation 608: Determine each target virtual illuminant corresponding to the virtual object in the virtual scene from each virtual illuminant bound to the preset spatial area to which the virtual object moves. For example, when the virtual object moves to a particular predefined spatial area of the plurality of predefined spatial areas, the target virtual light source from the one or more virtual light sources associated with the particular predefined spatial area is selected.

Operation 610: In a light chasing mode, obtain a direction pointing from a preset illuminant position to a preset object position, to obtain a first direction, obtain a direction pointing from the preset illuminant position to the current object position, to obtain a second direction, determine an offset between the first direction and the second direction, to obtain a first direction offset, and offset a preset illuminant direction in preset posture information by using the first direction offset, to obtain object update posture information of the target virtual illuminant. For example, a first direction is determined from the reference position of the target virtual light source to the reference position of the virtual object. A second direction is determined from the reference position of the target virtual light source to the current position of the virtual object. A directional offset is calculated between the first direction and the second direction. The reference direction of the target virtual light source is adjusted based on the directional offset to obtain the target pose data.

The preset illuminant position, the preset object position, the preset posture information, and the like are all preset, for example, may be set in a driving source stage of virtual light data in FIG. 7, and a position of a camera may be further preset.

Operation 612: In a non-light chasing mode, determine a position offset between the current object position and the preset object position, and offset the preset illuminant position in the preset posture information by using the position offset, to obtain the object update posture information of the target virtual illuminant. For example, a position offset is determined between the current position of the virtual object and the reference position of the virtual object. The reference position of the target virtual light source is adjusted based on the position offset to obtain the target pose data.

Operation 614: Update the object update posture information based on a position of the first virtual camera and a position of the second virtual camera, to obtain the target posture information of the target virtual illuminant. For example, the reference pose data is updated based on the pose offset to obtain intermediate pose data of the target virtual light source. The intermediate pose data is updated based on a position of the first virtual camera and a position of a second virtual camera to obtain the target pose data of the target virtual light source.

A viewing angle of the first virtual camera is a default viewing angle for observing the virtual scene, and the preset illumination information and the preset position information of the target virtual illuminant are pre-set under the viewing angle of the first virtual camera. In a case that a current viewing angle is not the viewing angle of the first virtual camera but the viewing angle of the second virtual camera, operation 614 may be performed. In a case that a viewing angle is the first virtual camera, operation 614 may be skipped, and the object update posture information is determined as the target posture information.

Operation 616: Determine a distance between the preset illuminant position and the preset object position, to obtain a first distance, determine a distance between a target illuminant position and the current object position, to obtain a second distance, determine an intensity update coefficient based on the first distance and the second distance, and update a preset illumination intensity in the preset illumination information by using the intensity update coefficient, to obtain target illumination information of the target virtual illuminant. For example, a first distance is calculated between the reference position of the target virtual light source and the reference position of the virtual object. a second distance is calculated between the target position of the target virtual light source and the current position of the virtual object. An intensity update coefficient is determined based on the first distance and the second distance. The reference illumination intensity is modified based on the intensity update coefficient to obtain the target illumination data.

Figure 8:
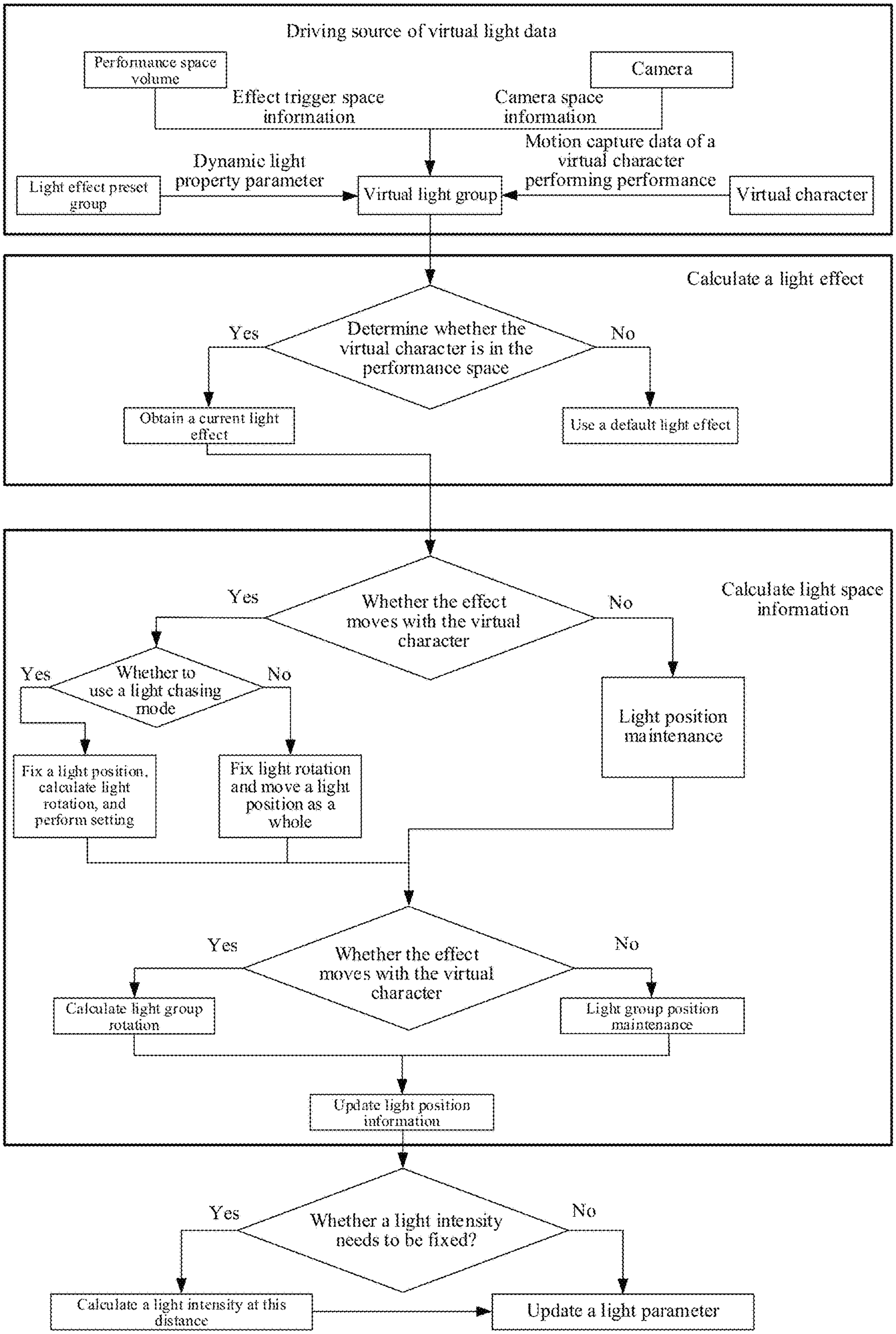
FIG. 8 is a schematic flowchart of an illumination control method according to some embodiments.

Operation 616 is configured to update an illumination intensity. The operation of updating the illumination intensity may be performed before the posture information is updated. As shown in FIG. 7, a light intensity is updated first and then light position information is updated. The operation of updating the illumination intensity may also be performed after the posture information is updated. As shown in FIG. 8, light position information is updated first and then a light intensity is updated.

Operation 618: Perform illumination rendering on the virtual object by using the target illumination information and the target posture information. For example, the illumination for the virtual object is rendered based on the target illumination data and the target pose data of the target virtual light source.

In this embodiment, when the virtual object moves and a viewing angle is not a preset viewing angle, the illumination information and the posture information are updated following the movement of the virtual object and the viewing angle, so that a change of an illumination effect produced by the virtual illuminant on the virtual object under the updated illumination information and posture information is as small as possible, thereby implementing reproduction of the illumination effect, reducing occurrence of an abnormal illumination effect, and improving the illumination effect.

The illumination control method provided in this disclosure is used in any virtual scene, to improve the illumination effect of the virtual object in the virtual scene. For example, in a digital human game scene, at least one target virtual illuminant is determined based on the current object position to which a digital human object moves in the virtual scene. The target virtual illuminant is a virtual illuminant whose posture varies with movement of the digital human object in the virtual scene. A posture offset produced for the target virtual illuminant is determined when the digital human object changes from the reference object position to the current object position, and the reference posture information is updated by using the posture offset, to obtain the target posture information of the target virtual illuminant. The reference posture information is the posture information of the target virtual illuminant in a case that the digital human object is located at the reference object position, and illumination rendering is performed on the digital human object by using the target illumination information and the target posture information of the target virtual illuminant. The illumination control method provided in this disclosure implements a virtual light automatic generation solution that is convenient for artistic creation and modification. Movement information of the digital character is extracted, and with reference to the viewing angle of the virtual camera, a real-time light atmosphere is automatically built. Compared with a related illuminating solution, light correction may be performed in real time on a moving character, to implement a better artistic effect, and also reduce complexity of manual operations, thereby improving illuminating efficiency.

Although the operations in the flowcharts involved in the embodiments are displayed sequentially according to instructions of arrows, these operations are not necessarily performed sequentially according to a sequence instructed by the arrows. Unless specified in this specification, there is no strict sequence limitation on the execution of the operations, and the operations may be performed in another sequence. Moreover, at least some of the operations in the flowchart related to the embodiments may include a plurality of operations or a plurality of stages. The operations or stages are not necessarily performed at the same moment but may be performed at different moments. The operations or stages are not necessarily performed sequentially, but may be performed in turn or alternately with another operation or at least some of operations or stages of the another operation.

Based on the similar concept, the embodiments of this disclosure further provide an illumination control apparatus configured to implement the foregoing illumination control method. An implementation solution provided by the apparatus to resolve the problem is similar to the implementation solution recorded in the foregoing method. Therefore, for a specific limitation in one or more illumination control apparatus embodiments provided below, refer to the limitations on the illumination control method in the foregoing. This is not described again herein.

Figure 9:
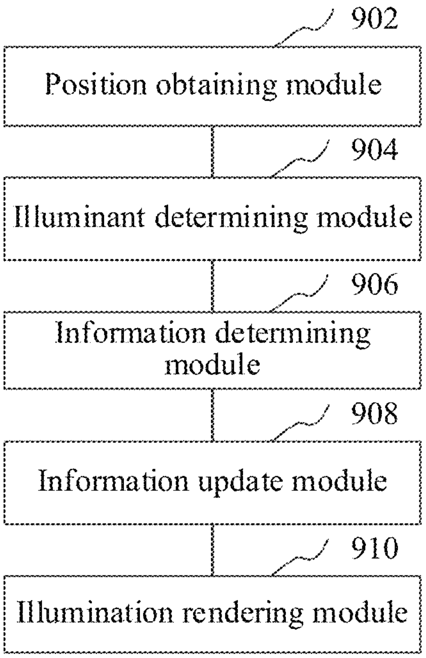
FIG. 9 is a structural block diagram of an illumination control apparatus according to some embodiments.

In some embodiments, as shown in FIG. 9, an illumination control apparatus is provided, including: a position obtaining module 902, an illuminant determining module 904, an information determining module 906, an information update module 908, and an illumination rendering module 910.

The position obtaining module 902 is configured to obtain a current object position to which a virtual object moves in a virtual scene;

The illuminant determining module 904 is configured to determine at least one target virtual illuminant based on the current object position, the target virtual illuminant being a virtual illuminant whose posture varies with the movement of the virtual object in the virtual scene.

The information determining module 906 is configured to determine reference posture information, the reference posture information being posture information of the target virtual illuminant in a case that the virtual object is located at a reference object position.

The information update module 908 is configured to determine a posture offset produced for the target virtual illuminant when the virtual object changes from a preset reference object position to the current object position, and update the reference posture information by using the posture offset, to obtain target posture information of the target virtual illuminant.

The illumination rendering module 910 is configured to obtain illumination information that is of the target virtual illuminant and that is configured for rendering to obtain target illumination information, and perform illumination rendering on the virtual object by using target illumination information and the target posture information of the at least one target virtual illuminant.

In some embodiments, the reference posture information includes a reference illuminant position and a reference illuminant direction. The information update module 908 is further configured to obtain a direction pointing from the reference illuminant position to the reference object position, to obtain a first direction; obtain a direction pointing from the reference illuminant position to the current object position, to obtain a second direction; determine an offset between the first direction and the second direction, to obtain a first direction offset; and offset the reference illuminant direction in the reference posture information by using the first direction offset, to obtain the target posture information of the target virtual illuminant.

In some embodiments, the reference posture information includes a reference illuminant position. The information update module 908 is further configured to determine a position offset between the current object position and the reference object position; and offset the reference illuminant position in the reference posture information by using the position offset, to obtain the target posture information of the target virtual illuminant.

In some embodiments, the virtual scene has a first virtual camera and a second virtual camera. The reference posture information is the posture information of the target virtual illuminant under a viewing angle of the first virtual camera when the virtual object is located at the reference object position. The information update module 908 is further configured to update the reference posture information by using the posture offset, to obtain object update posture information of the target virtual illuminant; and under a viewing angle of the second virtual camera, update the object update posture information based on a position of the first virtual camera and a position of the second virtual camera, to obtain the target posture information of the target virtual illuminant.

In some embodiments, the information update module 908 is further configured to determine a direction pointing from the position of the first virtual camera to the current object position, to obtain a third direction; determine a direction pointing from the position of the second virtual camera to the current object position, to obtain a fourth direction; determine an offset between the third direction and the fourth direction, to obtain a second direction offset; and update the object update posture information based on the second direction offset, to obtain the target posture information of the target virtual illuminant.

In some embodiments, the virtual scene includes at least one preset spatial area bound to the virtual object, and each preset spatial area is bound to at least one virtual illuminant in the virtual scene. The illuminant determining module 904 is further configured to: when determining, according to the current object position, that the virtual object moves to any preset spatial area bound to the virtual object, determine each target virtual illuminant corresponding to the virtual object in the virtual scene from each virtual illuminant bound to the preset spatial area to which the virtual object moves.

In some embodiments, the apparatus is further configured to emit a ray in any direction from a current object position of the virtual object; determine a total quantity of collisions between the ray and each preset spatial area bound to the virtual object; and when determining, based on the total quantity of collisions, that the virtual object is located in the preset spatial area to which the virtual object is bound, determine that the virtual object moves to a preset spatial area in which the ray collides for the first time.

In some embodiments, the apparatus is further configured to: when determining, based on the total quantity of collisions, that the virtual object is located outside the preset spatial area to which the virtual object is bound, perform illumination rendering on the virtual object based on preset illumination information and preset posture information of a preset virtual illuminant in the virtual scene.

In some embodiments, the illumination rendering module 910 is further configured to determine reference illumination information of the target virtual illuminant, where the reference illumination information is the illumination information of the target virtual illuminant when the virtual object is located at the reference object position; and update, according to the target posture information, the reference illumination information of the target virtual illuminant, to obtain the target illumination information of the target virtual illuminant.

In some embodiments, the reference illumination information includes a reference illumination intensity; the reference posture information includes a reference illuminant position; and the target posture information includes a target illuminant position. The illumination rendering module 910 is further configured to determine a distance between the reference illuminant position and the reference object position, to obtain a first distance; determine a distance between the target illuminant position and the current object position, to obtain a second distance; determine an intensity update coefficient based on the first distance and the second distance; and update the reference illumination intensity in the reference illumination information by using the intensity update coefficient, to obtain the target illumination information of the target virtual illuminant.

In some embodiments, the illumination rendering module 910 is further configured to obtain the intensity update coefficient based on a ratio of the second distance to the first distance.

In some embodiments, the illumination rendering module 910 is further configured to update the reference illumination intensity in the reference illumination information by using the intensity update coefficient, to obtain the target illumination information of the target virtual illuminant.

In some embodiments, the target virtual illuminant has a plurality of pieces of preset illumination information that are switched over time. The illumination rendering module 910 is further configured to obtain, from a plurality of pieces of preset illumination information that are preconfigured for the target virtual illuminant and that are switched over time, preset illumination information of the target virtual illuminant at a current time point as the target illumination information.

The modules in the foregoing illumination control apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In some embodiments, a computer device is provided. The computer device may be a server, and an internal structure diagram thereof may be shown in FIG. 10. The computer device includes a processor (e.g., processing circuitry), a memory (e.g., a non-transitory computer-readable storage medium), an input/output interface (I/O), and a communication interface. The processor, the memory, and the input/output interface are connected through the system bus, and the communication interface is connected to the system bus through the input/output interface. The processor of the computer device is configured to provide computing and control capabilities. The memory of the computer device includes a non-volatile storage medium and an internal memory. The non-volatile storage medium stores an operating system, a computer-readable instruction, and a database. The internal memory provides an environment for running of the operating system and the computer-readable instruction in the non-volatile storage medium. The database of the computer device is configured to store data involved in the illumination control method. The input/output interface of the computer device is configured to exchange information between the processor and the external device. The communication interface of the computer device is configured to communicate with an external terminal through a network connection. When executed by a processor, the computer-readable instruction implements an illumination control method.

In some embodiments, a computer device is provided. The computer device may be a terminal, and an internal structure diagram thereof may be shown in FIG. 11. The computer device includes a processor, a memory, an input/output interface, a communication interface, a display unit, and an input apparatus. The processor, the memory, and the input/output interface are connected through a system bus, and the communication interface, the display unit, and the input apparatus are connected to the system bus through the input/output interface. The processor of the computer device is configured to provide computing and control capabilities. The memory of the computer device includes a non-volatile storage medium and an internal memory. The non-volatile storage medium stores an operating system and computer-readable instructions. The internal memory provides an environment for running of the operating system and the computer-readable instruction in the non-volatile storage medium. The input/output interface of the computer device is configured to exchange information between the processor and the external device. The communication interface of the computer device is used for wired or wireless communication with external terminals. A wireless manner may be implemented through Wi-Fi, mobile cellular network, near field communication (NFC), or other technologies. When executed by a processor, the computer-readable instruction implements an illumination control method. The display unit of the computer device is configured to form a visually visible picture, which may be a display screen, a projection apparatus, or a virtual reality imaging apparatus. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 10:
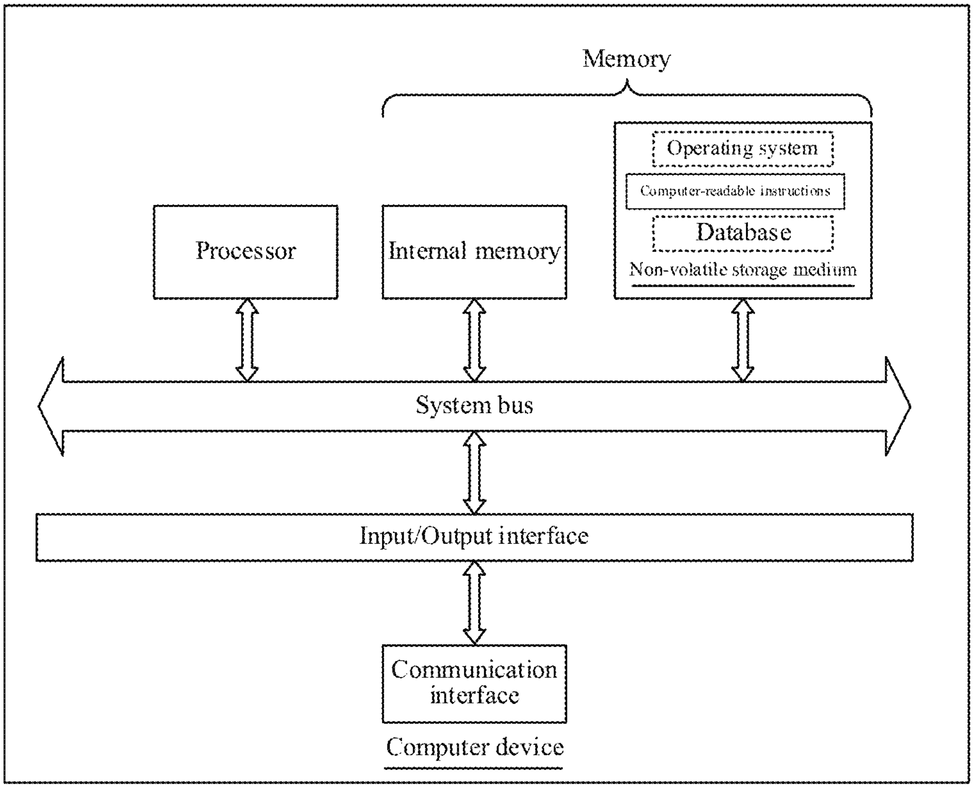
FIG. 10 is an internal structure diagram of a computer device according to some embodiments.
Figure 11:
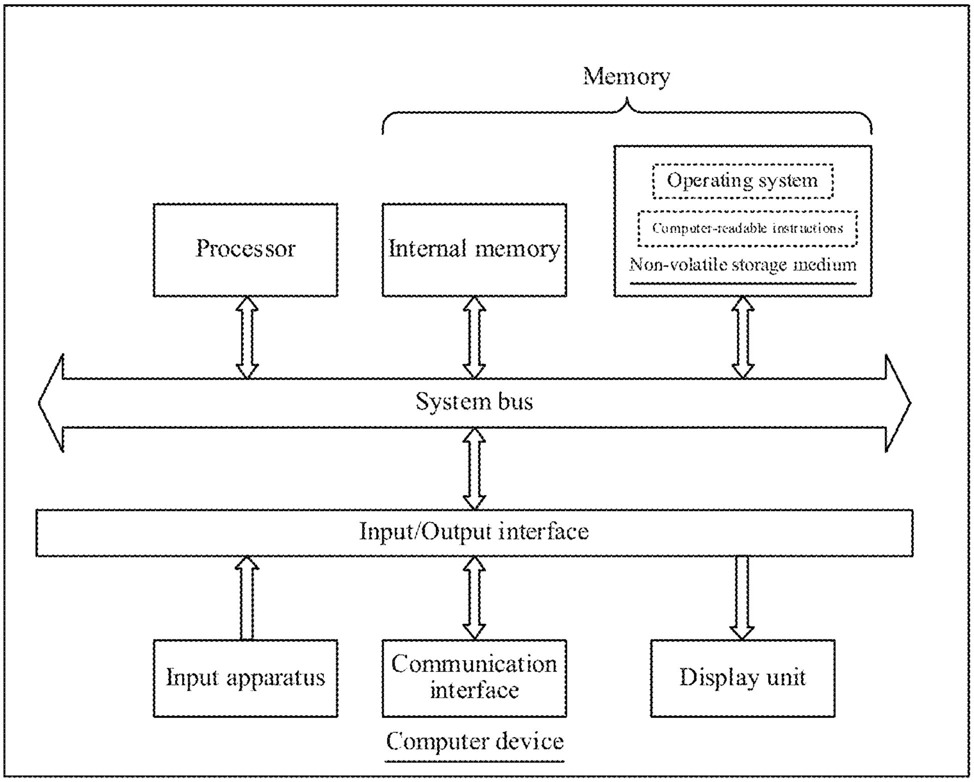
FIG. 11 is an internal structure diagram of a computer device according to some embodiments.

A person skilled in the art may understand that the structure shown in FIG. 10 and FIG. 11 is only a block diagram of a partial structure related to the solution of this disclosure, and does not limit the computer device to which the solution of this disclosure is applied. Specifically, the computer device may include more or fewer components than those shown in the figure, or some components may be combined, or different component deployment may be used.

In some embodiments, a computer device is provided, including a memory and one or more processors, the memory storing computer-readable instructions, and the processor, when executing the computer-readable instructions, implementing the foregoing illumination control method.

In some embodiments, one or more readable storage media is provided, having computer-readable instructions stored therein, the computer-readable instructions, when executed by a processor, implementing the foregoing illumination control method.

In some embodiments, a computer program product is provided, including computer-readable instructions, the computer-readable instructions, when executed by one or more processors, implementing the foregoing illumination control method.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

A person of ordinary skill in the art may understand that some or all procedures in the method in the foregoing embodiments may be implemented by a computer-readable instruction instructing related hardware. The computer-readable instruction may be stored in a non-volatile computer-readable storage medium, and when the computer-readable instruction is executed, the procedures in the foregoing method embodiments may be implemented. Any reference to a memory, a database, or another medium used in the embodiments provided in this disclosure may include at least one of a non-volatile memory and a volatile memory. The non-volatile memory may include a read-only memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a graphene memory, and the like. The volatile memory may include a random access memory (RAM) or an external cache memory. As a description and not a limit, the RAM may be in a plurality of forms, such as a static random access memory (SRAM) or a dynamic random access memory (DRAM). The databases involved in various embodiments provided in this disclosure may include at least one of a relational database and a non-relational database. The non-relational database may include a blockchain-based distributed database, and the like, but is not limited thereto. The processors involved in the various embodiments provided in this disclosure may be a general-purpose processor, a central processing unit, a graphics processor, a digital signal processor, a programmable logic device, a quantum computing-based data processing logic device, and the like, and are not limited thereto.

Technical features of the foregoing embodiments may be combined in different manners to form other embodiments. For concise description, not all possible combinations of the technical features in the embodiment are described. However, provided that combinations of the technical features do not conflict with each other, the combinations of the technical features are considered as falling within the scope recorded in this specification.

The foregoing embodiments show only several example implementations of this disclosure and are described in detail, which, however, are not to be construed as a limitation to the patent scope of this disclosure. For a person of ordinary skill in the art, several transformations and improvements can be made without departing from the idea of this disclosure. These transformations and improvements belong to the protection scope of this disclosure.

What is claimed is:

1. A method for controlling illumination in a virtual environment, the method comprising:

obtaining a current position of a virtual object in the virtual environment;

identifying a target virtual light source based on the current position, a pose of the target virtual light source being configured to change based on movement of the virtual object;

determining reference pose data for the target virtual light source based on a reference position of the virtual object;

calculating a pose offset for the target virtual light source based on the movement of the virtual object from the reference position to the current position;

updating the reference pose data based on the pose offset to obtain target pose data for the target virtual light source;

obtaining target illumination data based on illumination data of the target virtual light source; and rendering the illumination for the virtual object based on the target illumination data and the target pose data of the target virtual light source.

2. The method according to claim 1, wherein the reference pose data includes a reference position of the target virtual light source and a reference direction of the target virtual light source;

the calculating the pose offset comprises:

determining a first direction from the reference position of the target virtual light source to the reference position of the virtual object, determining a second direction from the reference position of the target virtual light source to the current position of the virtual object, and calculating a directional offset between the first direction and the second direction; and the updating the reference pose data includes adjusting the reference direction of the target virtual light source based on the directional offset to obtain the target pose data.

3. The method according to claim 1, wherein the reference pose data includes the reference position of the target virtual light source;

the calculating the pose offset includes determining a position offset between the current position of the virtual object and the reference position of the virtual object; and the updating the reference pose data includes adjusting the reference position of the target virtual light source based on the position offset to obtain the target pose data.

4. The method according to claim 1, wherein the reference pose data includes pose data of the target virtual light source from a viewing angle of a first virtual camera when the virtual object is located at the reference position, and the updating the reference pose data comprises:

updating the reference pose data based on the pose offset to obtain intermediate pose data of the target virtual light source; and updating the intermediate pose data based on a position of the first virtual camera and a position of a second virtual camera to obtain the target pose data of the target virtual light source.

5. The method according to claim 4, wherein the updating the intermediate pose data comprises:

determining a third direction from the position of the first virtual camera to the current position of the virtual object;

determining a fourth direction from the position of the second virtual camera to the current position of the virtual object;

calculating a second directional offset between the third direction and the fourth direction; and adjusting the intermediate pose data based on the second directional offset to obtain the target pose data.

6. The method according to claim 1, wherein the virtual environment includes a plurality of predefined spatial areas associated with the virtual object, each predefined spatial area of the plurality of predefined spatial areas being associated with one or more virtual light sources, and the identifying the target virtual light source comprises:

when the virtual object moves to a particular predefined spatial area of the plurality of predefined spatial areas, selecting the target virtual light source from the one or more virtual light sources associated with the particular predefined spatial area.

7. The method according to claim 6, further comprising:

emitting a ray from the current position of the virtual object;

determining a total number of intersections between the ray and the plurality of predefined spatial areas; and based on the total number of intersections, when the virtual object is located in one of the plurality of predefined spatial areas, identifying the predefined spatial area that the ray first intersects as the particular predefined spatial area.

8. The method according to claim 7, further comprising:

based on the total number of intersections, when the virtual object is located outside the predefined spatial area, rendering the illumination on the virtual object based on predefined illumination and predefined pose data of a preset virtual light source in the virtual environment.

9. The method according to claim 1, wherein the obtaining the target illumination data comprises:

determining reference illumination data for the target virtual light source when the virtual object is located at the reference position; and updating the reference illumination data based on the target pose data to obtain the target illumination data.

10. The method according to claim 9, wherein the reference illumination data includes a reference illumination intensity, the target pose data includes a target position of the target virtual light source, the updating the reference illumination data comprises:

calculating a first distance between the reference position of the target virtual light source and the reference position of the virtual object;

calculating a second distance between the target position of the target virtual light source and the current position of the virtual object;

determining an intensity update coefficient based on the first distance and the second distance; and modifying the reference illumination intensity based on the intensity update coefficient to obtain the target illumination data.

11. The method according to claim 10, wherein the determining the intensity update coefficient comprises:

calculating the intensity update coefficient based on a ratio of the second distance to the first distance.

12. The method according to claim 11, wherein the modifying the reference illumination intensity comprises:

applying the intensity update coefficient to the reference illumination intensity to obtain a target illumination intensity; and updating the reference illumination intensity based on the target illumination intensity to obtain the target illumination data.

13. The method according to claim 1, wherein the obtaining the target illumination data comprises:

selecting preset illumination data for a current time from a set of time-dependent preset illumination data associated with the target virtual light source.

14. An apparatus, comprising:

processing circuitry configured to:

obtain a current position of a virtual object in a virtual environment;

identify a target virtual light source based on the current position, a pose of the target virtual light source being configured to change based on movement of the virtual object;

determine reference pose data for the target virtual light source based on a reference position of the virtual object;

calculate a pose offset for the target virtual light source based on the movement of the virtual object from the reference position to the current position;

update the reference pose data based on the pose offset to obtain target pose data for the target virtual light source;

obtain target illumination data based on illumination data of the target virtual light source; and render illumination for the virtual object based on the target illumination data and the target pose data of the target virtual light source.

15. The apparatus according to claim 14, wherein the reference pose data includes a reference position of the target virtual light source and a reference direction of the target virtual light source;

the processing circuitry is configured to:

determine a first direction from the reference position of the target virtual light source to the reference position of the virtual object, determine a second direction from the reference position of the target virtual light source to the current position of the virtual object, calculate a directional offset between the first direction and the second direction; and the update of the reference pose data includes adjustment of the reference direction of the target virtual light source based on the directional offset to obtain the target pose data.

16. The apparatus according to claim 14, wherein the reference pose data includes the reference position of the target virtual light source;

the calculation of the pose offset includes a determination of a position offset between the current position of the virtual object and the reference position of the virtual object; and the update of the reference pose data includes an adjustment of the reference position of the target virtual light source based on the position offset to obtain the target pose data.

17. The apparatus according to claim 14, wherein the reference pose data includes pose data of the target virtual light source from a viewing angle of a first virtual camera when the virtual object is located at the reference position, and the processing circuitry is configured to:

update the reference pose data based on the pose offset to obtain intermediate pose data of the target virtual light source; and update the intermediate pose data based on a position of the first virtual camera and a position of a second virtual camera to obtain the target pose data of the target virtual light source.

18. The apparatus according to claim 17, wherein the processing circuitry is configured to:

determine a third direction from the position of the first virtual camera to the current position of the virtual object;

determine a fourth direction from the position of the second virtual camera to the current position of the virtual object;

calculate a second directional offset between the third direction and the fourth direction; and adjust the intermediate pose data based on the second directional offset to obtain the target pose data.

19. The apparatus according to claim 14, wherein the virtual environment includes a plurality of predefined spatial areas associated with the virtual object, each predefined spatial area of the plurality of predefined spatial areas is associated with one or more virtual light sources, and the processing circuitry is configured to:

when the virtual object moves to a particular predefined spatial area of the plurality of predefined spatial areas, select the target virtual light source from the one or more virtual light sources associated with the particular predefined spatial area.

20. A non-transitory computer-readable storage medium, storing instructions which when executed by a processor cause the processor to perform:

obtaining a current position of a virtual object in a virtual environment;

identifying a target virtual light source based on the current position, a pose of the target virtual light source being configured to change based on movement of the virtual object;

determining reference pose data for the target virtual light source based on a reference position of the virtual object;

calculating a pose offset for the target virtual light source based on the movement of the virtual object from the reference position to the current position;

updating the reference pose data based on the pose offset to obtain target pose data for the target virtual light source;

obtaining target illumination data based on illumination data of the target virtual light source; and rendering illumination for the virtual object based on the target illumination data and the target pose data of the target virtual light source.

* * * * *